US012049876B2

(12) United States Patent
Fotuhi

(10) Patent No.: US 12,049,876 B2
(45) Date of Patent: Jul. 30, 2024

(54) TEMPERATURE DIFFERENTIAL ENGINE

(71) Applicant: Rahim Fotuhi, Tehran (IR)

(72) Inventor: Rahim Fotuhi, Tehran (IR)

( * ) Notice: Subject to any disclaimer, the term of this patent is extended or adjusted under 35 U.S.C. 154(b) by 0 days.

(21) Appl. No.: 17/696,012

(22) Filed: Mar. 16, 2022

(65) Prior Publication Data
US 2022/0205435 A1    Jun. 30, 2022

Related U.S. Application Data

(63) Continuation-in-part of application No. PCT/IB2019/057819, filed on Sep. 17, 2019.

(51) Int. Cl.
*F03G 7/06*   (2006.01)
(52) U.S. Cl.
CPC .......... *F03G 7/0641* (2021.08); *F03G 7/062* (2021.08); *F03G 7/0633* (2021.08)
(58) Field of Classification Search
CPC ... F03G 6/00; F03G 6/002; F03G 6/02; F03G 6/04; F03G 6/06; F03G 3/00; F03G 3/087; F03G 3/091; F03G 7/10; F03G 7/104; F03G 7/107; F03G 7/06; F03G 7/061; F03G 7/06112; F03G 7/06113; F03G 7/06114; F03G 7/0641; F03G 7/062; F03G 7/0633
See application file for complete search history.

(56) References Cited

U.S. PATENT DOCUMENTS 3,665,705 A   5/1972  Christensen
3,803,845 A   4/1974  Dennis
4,143,517 A   3/1979  Compton
4,458,488 A * 7/1984  Negishi ............... F02G 1/04
                                              60/517
6,647,725 B1  11/2003 Letovsky
9,140,242 B2  9/2015  Liu
2004/0172941 A1* 9/2004 Bittner ................. F01K 25/02
                                              60/514
2014/0116047 A1* 5/2014 Tnaimou .............. F03G 6/04
                                              60/641.14

FOREIGN PATENT DOCUMENTS

DE   102010018616 A1   11/2011
DE   102010032777 A1    2/2012
JP      H05306676 A    11/1993

* cited by examiner

*Primary Examiner* — Mark A Laurenzi
*Assistant Examiner* — Xiaoting Hu
(74) *Attorney, Agent, or Firm* — Summit Patent Group

(57) ABSTRACT

In an example, an engine includes a thermal expansion unit comprising expansion material that expands in response to a temperature increase of the expansion material and contracts in response to a temperature decrease of the expansion material. The engine includes a structure comprising a heat receiving region, wherein at least a portion of the thermal expansion unit is disposed within the structure. The heat receiving region is configured to transfer thermal energy from a source of thermal energy to the expansion material through a first thermal energy transference path. The transfer of thermal energy to the thermal expansion unit causes expansion of the expansion material within the thermal expansion unit. The expansion of the expansion material causes an increase in length of the thermal expansion unit. The increase in length of the thermal expansion unit causes establishment of a second thermal energy transference path through which thermal energy is transferred from the expansion material to outside the thermal expansion unit.

20 Claims, 31 Drawing Sheets

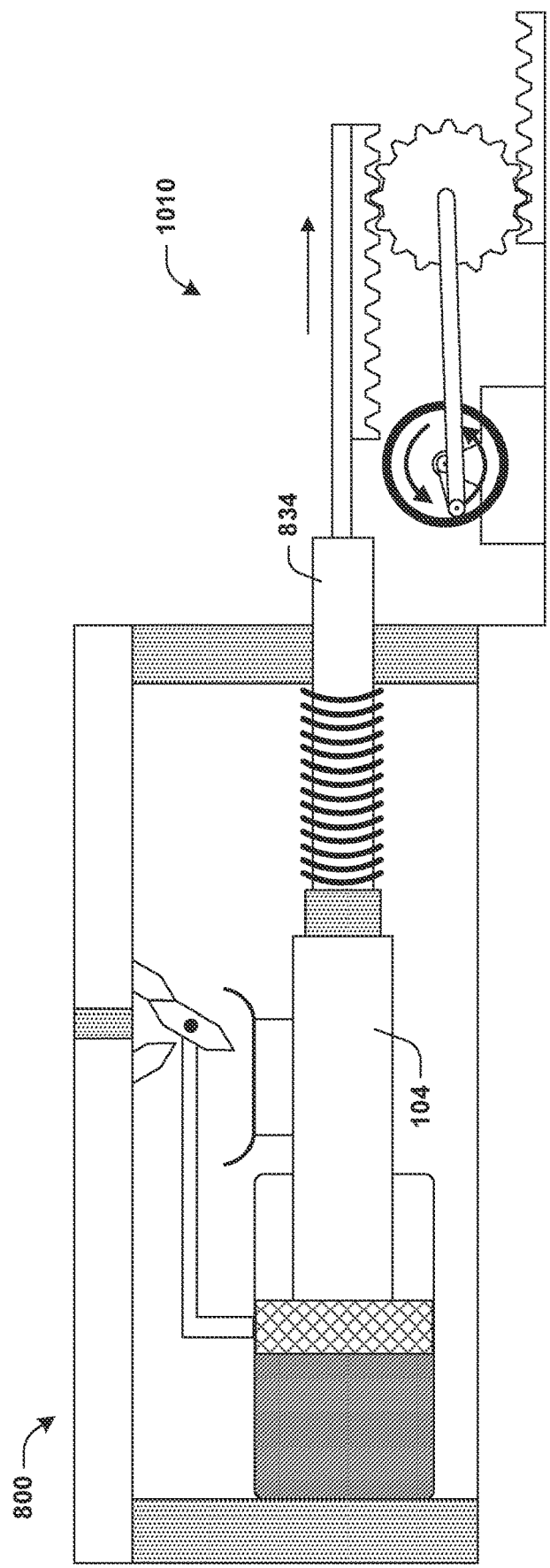

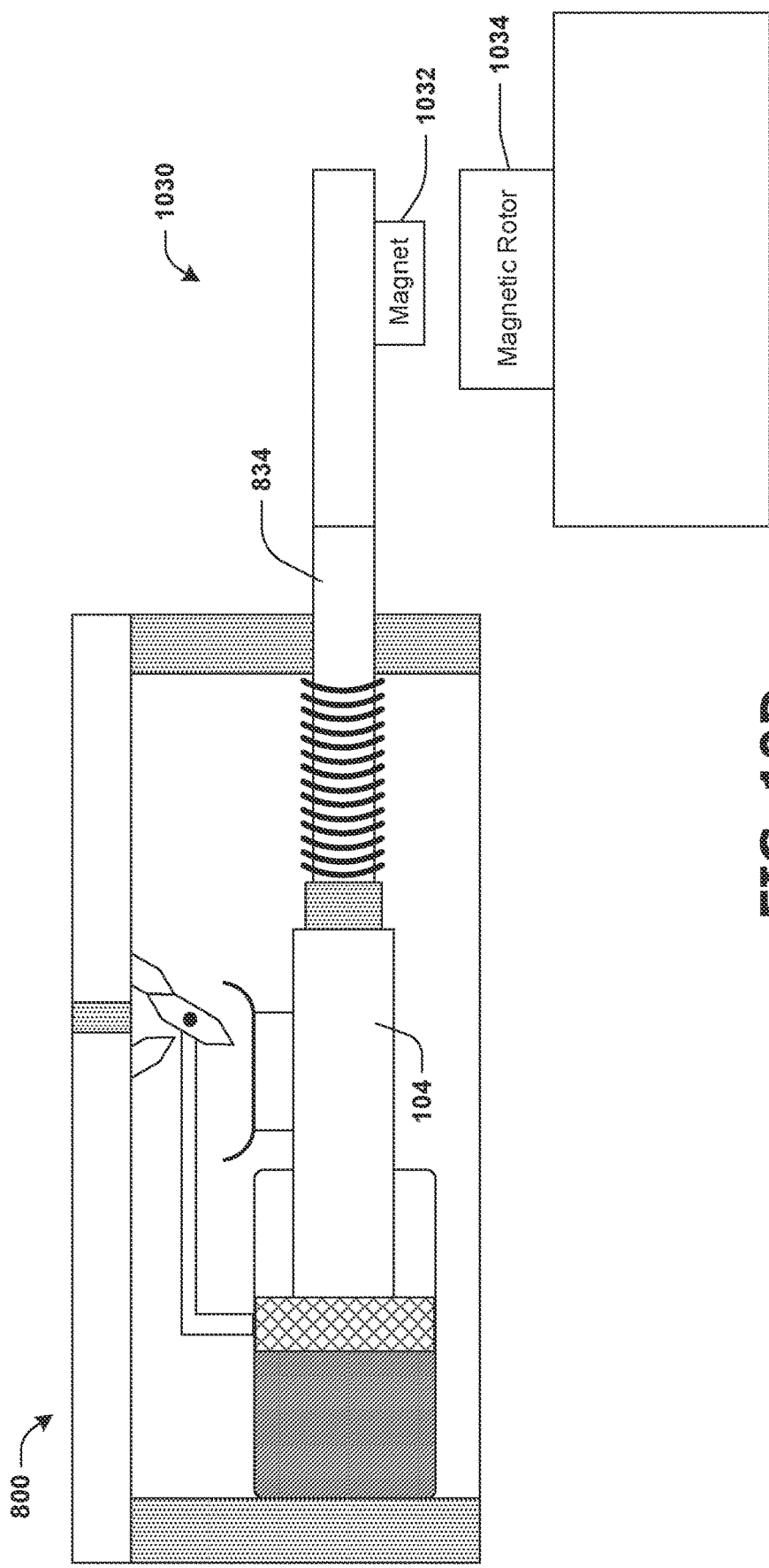

TEMPERATURE DIFFERENTIAL ENGINE

RELATED APPLICATION

This application claims priority to and is a continuation-in-part of International Application Number PCT/IB2019/057819, filed on Sep. 17, 2019, entitled "TEMPERATURE DIFFERENTIAL ENGINE", which is incorporated by reference herein in its entirety.

BACKGROUND

Due to the limited availability of fossil fuels and/or the impact of their use on the environment, many entities (e.g., companies, organizations, government agencies) make finding and/or using alternative fuel sources a priority (e.g., incentives for using alternative fuel sources may be offered, resources are dedicated towards more efficient use of alternative fuel sources, etc.).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with some embodiments, an engine is provided. The engine comprises a rotor, a plurality of thermal expansion units coupled to the rotor and/or a rotational structure configured to facilitate rotation of the rotor around a first axis of rotation. Each thermal expansion unit of the plurality of thermal expansion units comprises expansion material having a thermal expansion property in which the expansion material expands in response to a temperature increase of the expansion material and contracts in response to a temperature decrease of the expansion material. The rotational structure is configured to facilitate rotation of the rotor around a first axis of rotation. An inner surface of the rotational structure defines a space in which the rotor and the plurality of thermal expansion units are disposed. Thermal energy is transferred from a source of thermal energy to one or more first thermal expansion units, of the plurality of thermal expansion units, that are within a first region of the space. Transfer of thermal energy to the one or more first thermal expansion units causes expansion of expansion material within the one or more first thermal expansion units. The expansion of the expansion material within the one or more first thermal expansion units causes rotation of the rotor around the first axis of rotation.

In some embodiments, an engine is provided. The engine comprises a thermal expansion unit comprising a shaft and expansion material having a thermal expansion property in which the expansion material expands in response to a temperature increase of the expansion material and contracts in response to a temperature decrease of the expansion material. The engine comprises a force introducing unit configured to apply a force, to the shaft, in a first direction. In some examples, the force introducing unit comprises a resistance unit. The engine comprises a switch assembly configured to switch between a first state and a second state. The switch assembly is configured to transfer thermal energy from a source of thermal energy to the expansion material when the switch assembly is in the first state. The transfer of thermal energy from the source of thermal energy to the expansion material causes expansion of the expansion material. The expansion of the expansion material causes the shaft of the thermal expansion unit to move in a second direction, opposite the first direction, from a first position to a second position. The switch assembly is configured to switch to the second state during movement of the shaft in the second direction, when the shaft reaches the second position, and/or when the shaft reaches a third position between the first position and the second position. The switch assembly is configured to transfer thermal energy from the expansion material to outside the expansion material when the switch assembly is in the second state. The transfer of thermal energy from the expansion material to outside the expansion material causes contraction of the expansion material. The contraction of the expansion material and/or the force applied by the force introducing unit cause the shaft of the thermal expansion unit to move in the first direction.

In some embodiments, an engine is provided. The engine comprises a thermal expansion unit comprising expansion material having a thermal expansion property in which the expansion material expands in response to a temperature increase of the expansion material and contracts in response to a temperature decrease of the expansion material. The engine comprises a structure comprising a heat receiving region, wherein at least a portion of the thermal expansion unit is disposed within the structure. The heat receiving region is configured to transfer thermal energy from a source of thermal energy to the expansion material through a first thermal energy transference path. The transfer of thermal energy to the thermal expansion unit causes expansion of the expansion material within the thermal expansion unit. The expansion of the expansion material causes an increase in length of the thermal expansion unit. The increase in length of the thermal expansion unit causes establishment of a second thermal energy transference path through which thermal energy is transferred from the expansion material to outside the thermal expansion unit.

DESCRIPTION OF THE DRAWINGS

While the techniques presented herein may be embodied in alternative forms, the particular embodiments illustrated in the drawings are only a few examples that are supplemental of the description provided herein. The drawings have not necessarily been drawn to scale. These embodiments are not to be interpreted in a limiting manner, such as limiting the claims appended hereto.

FIGS. 10A-10E are drawings illustrating examples of an engine with reciprocal to rotary conversion apparatuses, according to some embodiments.

DETAILED DESCRIPTION

Figure 1A:
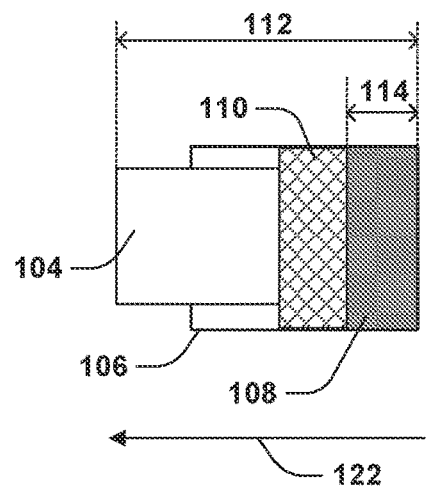
FIGS. 1A-1D are drawings illustrating examples of a thermal expansion unit, according to some embodiments.

Subject matter will now be described more fully herein after with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of mechanical devices, electro-mechanical devices, electrical devices, or any combination thereof.

In accordance with some embodiments of the present disclosure, a heat engine (e.g., a rotary heat engine, a reciprocal heat engine and/or other type of heat engine) with one or more thermal expansion units is provided. The one or more thermal expansion units may comprise expansion material that expands in response to a temperature increase of the expansion material and contracts in response to a temperature decrease of the expansion material. The engine includes a structure comprising a heat receiving region that is configured to transfer thermal energy to the one or more thermal expansion units. Alternatively and/or additionally, the structure may comprise a heat discharge region configured to discharge thermal energy from the one or more thermal expansion units. When the heat receiving region is in contact with a thermal expansion unit and/or transfers thermal energy to the thermal expansion unit, the thermal expansion unit expands, whereas when the heat discharge region is in contact with the thermal expansion unit and/or discharges thermal energy from the thermal expansion unit, the thermal expansion unit contracts. Expansion and/or contraction of the one or more thermal expansion units is used by the engine to generate mechanical energy, such as rotary motion, reciprocal motion (e.g., linear motion), and/or other type of motion. The mechanical energy may be used directly (for mechanical work, for example) or may be converted to a different form of energy (e.g., at least one of electrical power, a different form of mechanical energy, etc.). In an example, the heat engine may use waste heat, solar thermal energy, or other eco-friendly sources of heat to implement a temperature difference that enables the heat engine to generate the mechanical energy, thus providing for reduced fossil fuel consumption and/or further benefits to the environment. Further benefits of the disclosed subject matter may include lower temperature difference required for implementation of the heat engine (as compared to other heat engines), a wider variety of heat sources that can be used to run the heat engine (e.g., the heat engine may use any heat source even with low temperature differentials), a high level of torque of mechanical energy output by the heat engine, etc.

FIGS. 1A-1D illustrate examples of a thermal expansion unit 102 in accordance with some embodiments. As shown in FIG. 1A, the thermal expansion unit 102 may comprise a cylinder 106, a piston 110, a shaft 104 (e.g., a piston rod of the piston 110) and/or expansion material 108 disposed in the cylinder 106. The shaft 104 may be coupled to (e.g., affixed to) the piston 110 and/or may be a part of the piston 110. The expansion material 108 may have a thermal property in which the expansion material 108: (i) expands in response to a temperature increase of the expansion material; and/or (ii) contracts in response to a temperature decrease of the expansion material. For example, the expansion material 108 may expand in response to a temperature of the expansion material 108 increasing from a lower temperature range (e.g., a temperature range in which the expansion material 108 contracts and/or is in a contracted state) to a higher temperature range (e.g., a temperature range in which the expansion material 108 expands and/or is in an expanded state). Alternatively and/or additionally, the expansion material 108 may contract in response to the temperature of the expansion material 108 decreasing from the higher temperature range to the lower temperature range. In some embodiments, the expansion material 108 may have a high thermal expansion coefficient, such as a thermal expansion coefficient higher than a threshold thermal expansion coefficient. The expansion material 108 may comprise alcohol, mercury, paraffin and/or one or more other materials (e.g., one or more materials with high thermal expansion coefficient). Expansion of the expansion material 108 may cause a length of the thermal expansion unit 102 to increase. For example, when expanding, the expansion may push the shaft 104 in a direction 122, thereby increasing the length of the thermal expansion unit 102 (e.g., the expansion may push the piston 110 in the direction 122 causing the shaft 104 to move in the direction 122).

Figure 1B:
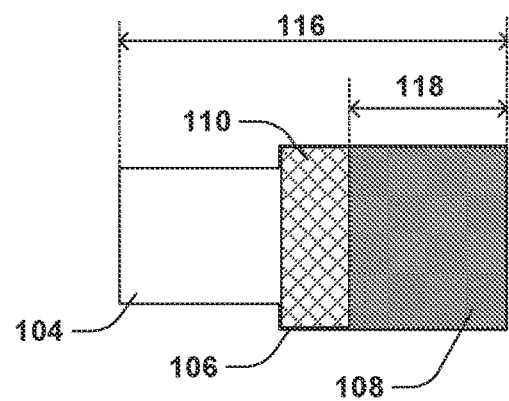

The illustration of FIG. 1A shows the thermal expansion unit 102 when the expansion material 108 is in a contracted state (e.g., a fully contracted state). FIG. 1B illustrates the thermal expansion unit 102 when the expansion material 108 is in an expanded state (e.g., a fully expanded state). For example, the thermal expansion unit 102 may change from being in the contracted state shown in FIG. 1A to the expanded state shown in FIG. 1B in response to transfer of thermal energy to the expansion material 108 (that increases the temperature of the expansion material 108 from the lower temperature range to the higher temperature range, for example). A length 114 (shown in FIG. 1A) of a region of the cylinder 106 occupied by the expansion material 108 in the contracted state is smaller than a length 118 (shown in FIG. 1B) of a region of the cylinder 106 occupied by the expansion material 108 in the expanded state. Alternatively and/or additionally, a length 112 (shown in FIG. 1A) of the thermal expansion unit 102 when the expansion material 108 is in the contracted state is smaller than a length 116 (shown in FIG. 1B) of the thermal expansion unit 102 when the expansion material 108 is in the expanded state.

In some embodiments, when the expansion material 108 changes from the expanded state to the contracted state, a force applied to the shaft 104 may cause the shaft 104 to move (e.g., retract) at least partially into the cylinder 106, such that the shaft 104 has the position shown in FIG. 1A.

Figure 1C:
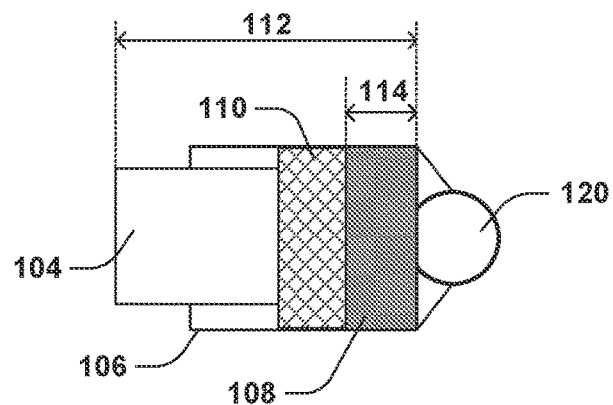
Figure 1D:
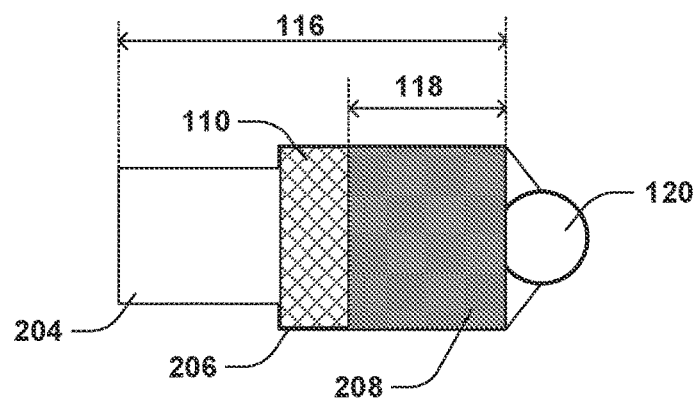

FIGS. 1C-1D illustrate examples of the thermal expansion unit 102 according to some embodiments in which the thermal expansion unit 102 comprises a bearing unit 120. For example, the bearing unit 120 may be configured to travel along a surface. The bearing unit 120 may comprise at least one of a ball bearing, a rolling bearing, a bearing comprising one or more rolling elements (e.g., one or more balls and/or one or more rollers) and/or one or more rings (e.g., one or more races), etc. The bearing unit 120 may be coupled to (e.g., affixed to) the cylinder 106, such as coupled to an end of the cylinder 106 proximal the expansion material 108.

It may be appreciated that other embodiments of the thermal expansion unit 102 are within the scope of the present disclosure. For example, the thermal expansion unit 102 may have a configuration and/or one or more components other than those shown in FIGS. 1A-1D. Alternatively and/or additionally, embodiments are contemplated in which the thermal expansion unit 102 does not comprise the piston 110 and/or the cylinder 106, wherein the thermal expansion unit 102 is configured to increase in length in response to expansion of the expansion material 108.

Figure 2A:
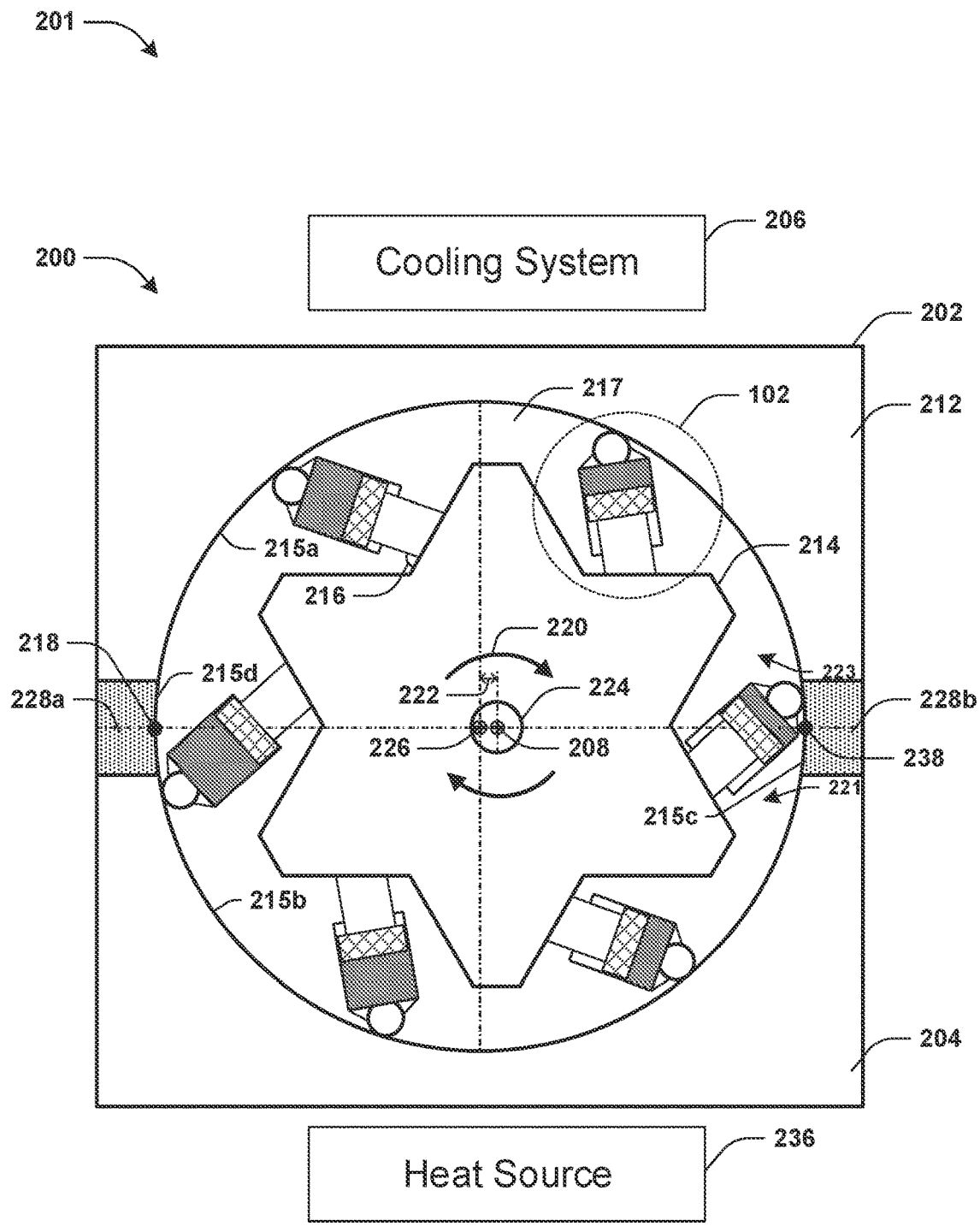
FIGS. 2A-2B are drawings illustrating examples of an engine, according to some embodiments.

FIG. 2A illustrates an example of a system 201 comprising an engine 200, such as a thermal differential engine and/or a heat engine, according to some embodiments. In an example, the engine 200 may comprise a rotary heat engine (and/or a swirl heat engine). The engine 200 may comprise a plurality of thermal expansion units 102, a rotor 214 and/or a rotational structure 202 (e.g., a cylinder) configured to facilitate rotation of the rotor 214. In some embodiments, each thermal expansion unit of the plurality of thermal expansion units 102 may have about the same configuration and/or about the same dimensions. Alternatively and/or additionally, configurations and/or dimensions of the plurality of thermal expansion units 102 may vary among each other.

The rotational structure 202 may comprise a heat receiving region 204, a heat discharge region 212 (e.g., a heat radiating section), and/or one or more insulation regions 228. In some embodiments, the heat receiving region 204, the heat discharge region 212 and/or the one or more insulation regions 228 may be different sections (e.g., separate sections of the rotational structure 202). Alternatively and/or additionally, the heat receiving region 204, the heat discharge region 212 and/or the one or more insulation regions 228 may be portions of a one piece structure. In some embodiments, at least some of the rotational structure 202, such as the heat receiving region 204 and/or the heat discharge region 212, may be made of one or more metals and/or one or more metal alloys (e.g., the heat receiving region 204 and/or the heat discharge region 212 of the rotational structure 202 may be made of steel). In some embodiments, an insulation region of the one or more insulation regions 228 is between the heat receiving region 204 and the heat discharge region 212. An insulation region of the one or more insulation regions 228 may comprise thermal insulation to mitigate and/or prevent direct heat transfer between the heat receiving region 204 and the heat discharge region 212. The one or more insulation regions 228 may comprise polytetrafluoroethylene (PTFE) (e.g., Teflon), insulation foam, and/or one or more other materials that provide thermal insulation. In some embodiments, the one or more insulation regions 228 may comprise a first insulation region 228a on a first side of the rotational structure 202 and/or a second insulation region 228b on a second side of the rotational structure 202 opposite the first side.

In some embodiments, an output shaft 224 (e.g., a rotatable shaft) may be coupled to (e.g., affixed to, such as soldered to) the rotor 214 (e.g., the output shaft 224 may be part of the rotor 214). The output shaft 224 may rotate as the rotor 214 rotates. The rotor 214 and/or the output shaft 224 may rotate around a first axis of rotation 208. For example, the rotor 214 and/or the output shaft 224 may rotate in a direction of rotation 220 as a result of a rotational force introduced to the rotor 214 by the expansion of expansion material within one or more thermal expansion units of the plurality of thermal expansion units 102. In some embodiments, the first axis of rotation 208 may be offset 222 from a centroid 226 of a space 217 defined by an inner surface 215 of the rotational structure 202 (e.g., the centroid 226 may correspond to a centroid of the rotational structure 202), wherein the rotor 214 and the plurality of thermal expansion units 102 are disposed within the space 217 defined by the inner surface 215. For example, the first axis of rotation 208 (and/or the output shaft 224) may be positioned eccentric (e.g., slightly eccentric) within the space 217. In some embodiments, the inner surface 215 defines at least part of a circle (such as where the space 217 has a circular shape) or at least part of an ellipse (such as where the space 217 has an elliptical shape). In some embodiments, the first axis of rotation 208 may change position over time during operation of the engine 200. Alternatively and/or additionally, the first axis of rotation 208 may remain constant (e.g., may not change position) during operation of the engine 200.

In an example, the inner surface 215 of the rotational structure 202 corresponds to an inner surface of a cylinder (e.g., the rotational structure 202) configured to facilitate rotation of the rotor 214. The inner surface 215 of the rotational structure 202 may comprise an inner surface 215a of the heat discharge region 212 (e.g., a first semi-circular or semi-elliptical portion of the cylinder), an inner surface 215b of the heat receiving region 204 (e.g., a second semi-circular or semi-elliptical portion of the cylinder), an inner surface 215c of the second insulation region 228b, and/or an inner surface 215d of the first insulation region 228a.

The plurality of thermal expansion units 102 may be coupled to (e.g., affixed to, such as soldered to) the rotor 214. For example, each thermal expansion unit of one, some and/or all of the plurality of thermal expansion units 102 may be coupled to the rotor 214 at an end of the thermal expansion unit (e.g., an end of the thermal expansion unit that is proximal a piston of the thermal expansion unit and distal a bearing unit of the thermal expansion unit, such as an end of a shaft of the thermal expansion unit). In some embodiments, one, some and/or all of the plurality of thermal expansion units 102 are aligned radially with respect to the output shaft 224. As shown in FIG. 2A, one, some and/or all of the plurality of thermal expansion units 102 are angled towards (e.g., slightly towards) a direction opposite the direction of rotation 220. In some embodiments, an angle 216 of orientation of a thermal expansion unit with respect to a surface of the rotor 214 to which the thermal expansion unit is coupled may be less than 90 degrees. Although not shown in FIG. 2A, embodiments are contemplated in which a thermal expansion unit is angled towards the direction of rotation 220 and/or the angle 216 is greater than (and/or equal to) 90 degrees. In some embodiments, a thermal expansion unit of the plurality of thermal expansion units 102 may be coupled to the rotor 214 via a hinge that allows movement of the thermal expansion unit. Alternatively and/or additionally, the thermal expansion unit may not be coupled to the rotor 214 with a hinge.

Bearing units of one, some and/or all of the plurality of thermal expansion units 102 may be in contact with the inner surface 215 of the rotational structure 202. For example, a bearing unit of a thermal expansion unit may travel along the inner surface 215 during rotation of the rotor 214 around the first axis of rotation 208. For example, a bearing unit may reduce a resistance (e.g., friction) between a thermal expansion unit and the inner surface 215 as compared to a scenario in which the thermal expansion unit does not comprise a bearing unit, and thus, implementation of the thermal expansion unit with the bearing unit may provide for at least one of increased speed, increased power, etc. of rotation of the rotor 214 around the first axis of rotation 208.

In some embodiments, the heat receiving region 204 may be configured to facilitate transfer of thermal energy from a heat source 236 (e.g., a source of thermal energy) to expansion material of one or more thermal expansion units of the plurality of thermal expansion units 102, such as one or more thermal expansion units that are in contact with the inner surface 215*b* of the heat receiving region 204 and/or that are within a first region 221 of the space 217 defined by the inner surface 215 of the rotational structure 202. The first region 221 of the space 217 may correspond to a section, of the space 217, proximal the heat receiving region 204.

The first region 221 of the space 217 defined by the inner surface 215 of the rotational structure 202 may be separate from (e.g., does not overlap with) a second region 223 (discussed below) of the space 217. In an example, the first region 221 may correspond to some or all of a region, of the space 217, that is between a first inner surface section 252 (discussed below) and a line between a first point 218 (discussed below) and a second point 238 (discussed below). In an example, the second region 223 may correspond to some or all of a region, of the space 217, that is between a second inner surface section 254 (discussed below) and the line between the first point 218 and the second point 238.

In some embodiments, the thermal energy may be transferred to expansion material of the one or more thermal expansion units by way of convection, thermal conduction and/or thermal radiation.

In some embodiments, the heat receiving region 204 may be heated using thermal energy from the heat source 236, wherein thermal energy may be transferred from the heat receiving region 204 to expansion material of the one or more thermal expansion units (that are in contact with the inner surface 215*b* of the heat receiving region 204, for example). For example, a bearing unit of a thermal expansion unit of the one or more thermal expansion units may be in contact with the inner surface 215*b* of the heat receiving region 204, wherein thermal energy is transferred from the heat receiving region 204, to expansion material of the thermal expansion unit, via the bearing unit.

In some embodiments, gas (e.g., air, oxygen and/or other gas) and/or liquid (e.g., water and/or other liquid) within the first region 221 of the space 217 may be heated using thermal energy from the heat source 236, wherein thermal energy may be transferred from the gas and/or the liquid to expansion material of the one or more thermal expansion units (that are within the first region 221, for example). In some embodiments, the gas and/or the liquid within the first region 221 of the space 217 may be heated by way of conduction, convection, and/or radiation. In some embodiments, the gas and/or the liquid within the first region 221 may be heated by way of heating the heat receiving region 204 using thermal energy from the heat source 236, wherein thermal energy is transferred, from the heat receiving region 204, to the gas and/or the liquid within the first region 221 of the space 217.

In some embodiments, thermal energy may be transferred to expansion material of the one or more thermal expansion units by way of conducting, through the heat receiving region 204, heated gas and/or heated liquid (e.g., boiling liquid, such as boiling water) into the first region 221 (e.g., the heated gas and/or the heated liquid may be heated using the heat source 236), wherein thermal energy is transferred from the heated gas and/or the heated liquid to expansion material of the one or more thermal expansion units (that are within the first region 221, for example). In some embodiments, the heated gas and/or the heated liquid may be conducted into the first region 221 via one or more openings in the heat receiving region 204. Embodiments are contemplated in which the heated gas and/or the heated liquid conducted into the first region 221 via one or more parts of the rotational structure 202 other than the heat receiving region 204, such as through one or more openings through the one or more insulation regions 228.

In some embodiments, thermal energy may be transferred to expansion material of the one or more thermal expansion units by way of allowing, through the heat receiving region 204, radiation (e.g., solar radiation or other type of radiation) to heat the expansion material of the one or more thermal expansion units. For example, the radiation may heat the expansion material via one or more openings in the heat receiving region 204. Alternatively and/or additionally, the radiation may heat the expansion material via at least a portion of the heat receiving region 204, such as at least a portion of the heat receiving region 204 that is transparent (such as made of glass).

In some embodiments, the heat source 236 may comprise solar thermal energy. In some embodiments, the solar thermal energy may be transferred to the heat receiving region 204 via a solar thermal collector and/or magnifier, such as at least one of a solar parabolic dish, a lens heat collector (e.g., a Fresnel lens heat collector), etc. that may direct the solar thermal energy to the heat receiving region 204 (e.g., the solar thermal collector and/or magnifier may collect heat by absorbing sunlight and/or transmitting the sunlight and/or the heat to the heat receiving region 204).

In some embodiments, the heat source 236 may comprise a source of heat waste, such as at least one of a machine, a car, a power plant (e.g., a nuclear power plant and/or other type of power plant), a manufacturing plant, a generator, a home, a motor vehicle (e.g., an automobile cooling system), industrial machinery and/or equipment, a cooling tower, etc. that produces heat (e.g., the heat may be produced as a byproduct of work performed by the source). For example, the heat waste may be directed to the heat receiving region 204 via at least one of one or more tubes, one or more exhausts, etc.

In some embodiments, the heat source 236 may comprise a source that produces thermal energy using fossil fuels. For example, the thermal energy may be transferred to the heat receiving region 204 and/or the first region 221 of the space 217 defined by the inner surface 215 of the rotational structure 202.

In some embodiments, the heat source 236 may be within the first region 221, such as in an example in which at least one of heated liquid, heated air, a heater, radiation, etc. is within the first region 221. In some embodiments, the heat receiving region 204 may be configured to prevent and/or inhibit at least one of heated liquid, heated air, a heater, radiation, etc. from escaping the first region 221. Embodiments are contemplated in which the heat receiving region 204 is used for purposes other than transferring thermal energy to thermal expansion units (such as where a main function of the heat receiving region 204 is to facilitate rotation of the rotor 214 and/or the plurality of thermal expansion units 102 around the first axis of rotation 208).

In some embodiments, the heat discharge region 212 may be configured to transfer thermal energy from expansion material of one or more thermal expansion units of the plurality of thermal expansion units 102 to outside the expansion material, such as one or more thermal expansion units that are in contact with the inner surface 215*a* of the heat discharge region 212 and/or that are within the second region 223 of the space 217 defined by the inner surface 215 of the rotational structure 202. For example, the heat discharge region 212 may be configured to discharge thermal energy from within the second region 223 to outside the second region 223 (such as discharge the thermal energy to outside the heat discharge region 212 and/or to outside the rotational structure 202) and/or may be configured to discharge thermal energy from within the heat discharge region 212 to outside the heat discharge region 212 (such as discharge the thermal energy to outside the rotational structure 202). The second region 223 of the space 217 may correspond to a section, of the space 217, proximal the heat discharge region 212. In some embodiments, a cooling system 206 may be used to transfer thermal energy from within the second region 223 and/or within the heat discharge region 212 to outside the second region 223 and/or outside the heat discharge region 212. In some embodiments, the cooling system 206 may comprise a cooling tank and/or a liquid cooling system configured to maintain and/or reduce a temperature of at least one of the heat discharge region 212, the second region 223, the one or more thermal expansion units, etc. In some embodiments, the cooling system 206 may conduct cooling fluid (e.g., relatively low temperature fluid, such as liquid and/or gas, used to lower a temperature of one or more components) into the second region 223, wherein the cooling fluid may be in contact with the one or more thermal expansion units and/or may reduce the temperature of the one or more thermal expansion units (and/or reduce the temperature of expansion material within the one or more thermal expansion units). In an example, the cooling fluid may comprise water. In some embodiments, the cooling fluid may be conducted into the second region 223 via one or more openings in the heat discharge region 212. Embodiments are contemplated in which the cooling system 206 is not used by the engine 200, such as where surrounding fluid (e.g., air and/or liquid that is not cooled using the cooling system 206) is used to maintain and/or reduce a temperature of at least one of the heat discharge region 212, the second region 223, the one or more thermal expansion units, etc.

Accordingly, using the heat source 236, the heat receiving region 204, the cooling system 206 and/or the heat discharge region 212, a temperature difference may be implemented in the engine 200 in which the first region 221 and/or the heat receiving region 204 have a higher temperature than the second region 223 and/or the heat discharge region 212. In an example, the temperature of the first region 221 and/or the temperature of the heat receiving region 204 are within or above the higher temperature range (e.g., the temperature range in which expansion material of a thermal expansion unit expands and/or is in an expanded state). In an example, the temperature of the second region 223 and/or the temperature of the heat discharge region 212 are within or below the lower temperature range (e.g., the temperature range in which expansion material of a thermal expansion unit contracts and/or is in a contracted state). In some embodiments, the one or more insulation regions 228 may assist in maintaining the temperature difference and/or may prevent the first region 221 and the second region 223 from reaching thermal equilibrium (and/or may prevent the heat receiving region 204 and the heat discharge region 212 from reaching thermal equilibrium). Implementation of the temperature difference in the engine 200 may cause rotation of the rotor 214 as a result of expansion and/or contraction of expansion material within thermal expansion units of the plurality of thermal expansion units 102, such as discussed herein. In some embodiments, rotation of the rotor 214 continues while the temperature difference in the engine 200 is maintained.

In some embodiments, at a given time, expansion material of one or more first thermal expansion units (of the plurality of thermal expansion units 102) may expand while expansion material of one or more second thermal expansion units (of the plurality of thermal expansion units 102) may contract. For example, the expansion material of the one or more first thermal expansion units may expand due to the one or more first thermal expansion units being in contact with the (higher temperature) heat receiving region 204 and/or being within the (higher temperature) first region 221 (e.g., the expansion material of the one or more first thermal expansion units may expand due to a temperature of the expansion material being sufficiently high to expand when the one or more first thermal expansion units are in contact with the heat receiving region 204 and/or are within the first region 221). Alternatively and/or additionally, the expansion material of the one or more second thermal expansion units may contract due to the one or more second thermal expansion units being in contact with the (lower temperature) heat discharge region 212 and/or being within the (lower temperature) second region 223 (e.g., the expansion material of the one or more second thermal expansion units may contract due to a temperature of the expansion material being sufficiently low to contract when the one or more second thermal expansion units are in contact with the heat discharge region 212 and/or are within the second region 223). The expansion of the expansion material of the one or more first thermal expansion units may apply a rotational force to the rotor 214, while the contraction of the expansion material of the one or more second thermal expansion units may allow the applied rotational force to rotate the rotor 214 in the direction of rotation 220. The rotor 214 may continuously rotate around the first axis of rotation 208 as a result of the expansion and/or contraction (e.g., continuous expansion and contraction) of expansion material within thermal expansion units of the plurality of thermal expansion units 102. For example, a thermal expansion unit may cycle (e.g., continuously cycle) between expanding (e.g., when the thermal expansion unit is in contact with the heat receiving region 204 and/or is within the first region 221) and contracting (e.g., when the thermal expansion unit is in contact with the heat discharge region 212 and/or is within the second region 223) such that the rotor 214 rotates (e.g., continuously rotates) around the first axis of rotation 208.

In some embodiments, implementation of the offset 222 (and/or implementation of the first axis of rotation 208 and/or the output shaft 224 being positioned eccentric within the space 217) between the first axis of rotation 208 and the centroid 226 may enable the rotor 214 to rotate in the direction of rotation 220. For example, as a result of the offset 222 (and/or as a result of the first axis of rotation 208 and/or the output shaft 224 being positioned eccentric within the space 217), distances between the first axis of rotation 208 and points across the inner surface 215 of the rotational structure 202 may vary. In some embodiments, a maximum distance between the first axis of rotation 208 and the inner surface 215 is between the first point 218 of the inner surface 215 and the first axis of rotation 208, while a minimum distance between the first axis of rotation 208 and the inner surface 215 is between the second point 238 of the inner surface 215 and the first axis of rotation 208. That is, the first point 218 may be the farthest point of the inner surface 215 from the first axis of rotation 208 and the second point 238 may be the closest point of the inner surface 215 to the first axis of rotation 208. The first point 218 may correspond to a point of the inner surface 215d of the first insulation region 228a. The second point 238 may correspond to a point of the inner surface 215c of the second insulation region 228b. A difference between the minimum distance and the maximum distance may be about equal to a length of the offset 222 between the first axis of rotation 208 and the centroid 226. For example, the minimum distance and the maximum distance may be configured by configuring the offset 222. In some embodiments, thermal expansion units that are proximal the first point 218 of the inner surface 215 and distal the second point 238 of the inner surface 215 (e.g., thermal expansion units that are closer to the first point 218 than the second point 238) may be larger (e.g., have larger lengths as a result of expansion) than thermal expansion units that are proximal the second point 238 of the inner surface 215 and distal the first point 218 of the inner surface 215 (e.g., thermal expansion units that are closer to the second point 238 than the first point 218), thus the first point 218 being farther away from the first axis of rotation 208 provides for more room for the larger thermal expansion units to pass without becoming stuck. Since thermal expansion units that are proximal the second point 238 are smaller, the thermal expansion units may move in the direction of rotation 220 without becoming stuck at the second point 238 (even though the second point 238 is closer to the first axis of rotation 208 than the first point 238).

Embodiments are contemplated where: (i) the first point 218 is located at or near a boundary (e.g., on the first side of the rotational structure 202) between the heat receiving region 204 and the heat discharge region 212; (ii) the first point 218 is located at or near a boundary between the heat receiving region 204 and the first insulation region 228a; and/or (iii) where the first point 218 is located at or near a boundary between the heat discharge region 212 and the first insulation region 228a. Embodiments are contemplated where: (i) the second point 238 is located at or near a boundary (e.g., on the second side of the rotational structure 202) between the heat receiving region 204 and the heat discharge region 212; (ii) the second point 238 is located at or near a boundary between the heat receiving region 204 and the second insulation region 228b; and/or (iii) the second point 238 is located at or near a boundary between the heat discharge region 212 and the second insulation region 228b.

Figure 2B:
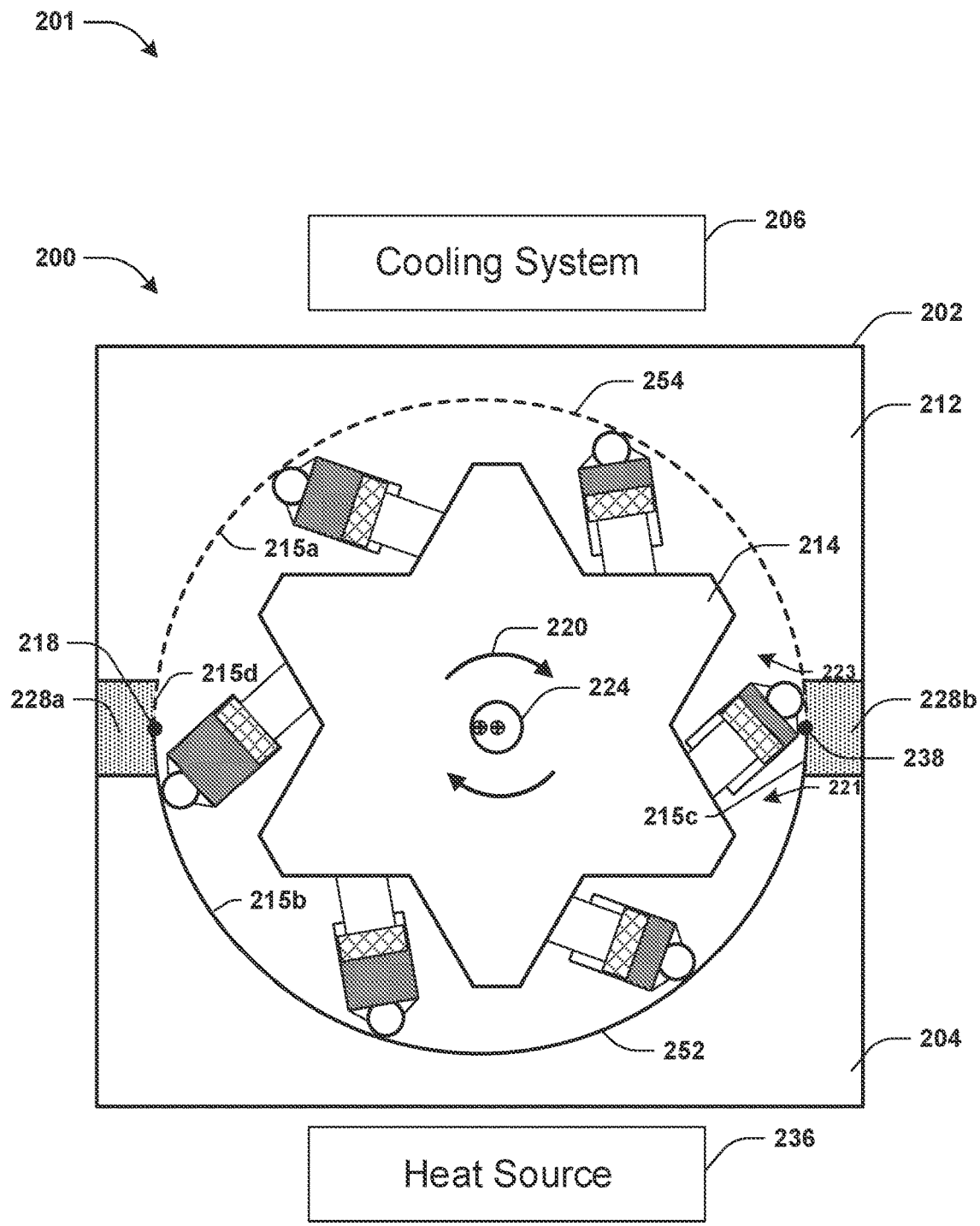

In some embodiments, the inner surface 215 of the rotational structure 202 comprises a first inner surface section 252 (the reference number "252" is shown in FIG. 2B) between the first point 218 and the second point 238 and a second inner surface section 254 (the reference number "254" is shown in FIG. 2B) between the first point 218 and the second point 238, wherein the first inner surface section 252 is opposite (e.g., faces) the second inner surface section 254. For clarity purposes, FIG. 2B illustrates the first inner surface section 252 as a solid-line curve and the second inner surface section 254 as a dashed-line curve.

The first inner surface section 252 may be adjacent to and/or aligned with the first region 221 of the space 217 and/or the second inner surface section 254 may be adjacent to and/or aligned with the second region 223 of the space 217. In an example, the first inner surface section 252 and the second inner surface section 254 may correspond to two separate halves of the inner surface 215 of the rotational structure 202. The first inner surface section 252 may comprise at least a portion of the inner surface 215b of the heat receiving region 204. In an example, the first inner surface section 252 comprises the inner surface 215b of the heat receiving region 204, a portion of the inner surface 215d of the first insulation region 228a and/or a portion of the inner surface 215c of the second insulation region 228b. The second inner surface section 254 comprises at least a portion of the inner surface 215a of the heat discharge region 212. In an example, the second inner surface section 254 comprises the inner surface 215a of the heat discharge region 212, a portion of the inner surface 215d of the first insulation region 228a and/or a portion of the inner surface 215c of the second insulation region 228b.

In some embodiments, along the direction of rotation 220, distances between points of the first inner surface section 252 and the first axis of rotation 208 increase. Accordingly, in some embodiments, as a thermal expansion unit expands while moving along (e.g., in contact with) the first inner surface section 252 in the direction of rotation 220, the thermal expansion unit is provided with increasing room for the thermal expansion unit to expand (e.g., increase in length) such that the thermal expansion unit does not become stuck.

In some embodiments, along the direction of rotation 220, distances between points of the second inner surface section 254 and the first axis of rotation 208 decrease. Accordingly, in some embodiments, as a thermal expansion unit contracts while moving along (e.g., in contact with) the second inner surface section 254 in the direction of rotation 220, the thermal expansion unit decreases in length as expansion material within the thermal expansion unit contracts.

In some embodiments, a volume of a region between the first axis of rotation 208 and an area of the inner surface 215 of the rotational structure 202 is related to (e.g., a function of) a distance between the first axis of rotation 208 and the area of the inner surface 215.

FIGS. 3A-3L illustrate an example of a rotation cycle of the engine 200. The example of the rotation cycle is described with respect to a first thermal expansion unit 102a of the plurality of thermal expansion units 102.

In FIGS. 3A-3F, the first thermal expansion unit 102a is in the first region 221 and travels along the first inner surface section 252. For example, a bearing unit of the first thermal expansion unit 102a may be in contact with and/or may roll along the first inner surface section 252. In some embodiments, while traveling across at least a portion of the first inner surface section 252, expansion material in the first thermal expansion unit 102a expands (e.g., continuously expands while traveling across at least a portion of the first inner surface section 252). For example, the expansion (e.g., continuous expansion) of the expansion material may be due to: (i) a temperature of the expansion material increasing as the first thermal expansion unit 102a travels across at least a portion of the first inner surface section 252; (ii) the first thermal expansion unit 102a being in contact with the (higher temperature) heat receiving region 204; and/or (iii) the first thermal expansion unit 102a being within the (higher temperature) first region 221. In an example, the expansion material may begin heating up and/or expanding when and/or after the first thermal expansion unit 102a enters the first region 221 and/or becomes in contact with the inner surface 215b (shown in FIG. 2A) of the heat receiving region 204. For example, the expansion material may begin heating up as the first thermal expansion unit 102a enters the first region 221 and/or becomes in contact with the inner surface 215b of the heat receiving region 204, wherein the expansion material may begin expanding after the first thermal expansion unit 102a enters the first region 221 and/or becomes in contact with the inner surface 215b of the heat receiving region 204. In an example, the expansion material in the first inner surface section 252 begins to expand during, prior to and/or after the instance shown in FIG. 3A, and continues to expand (e.g., continuously) throughout the instances shown in FIGS. 3B-3F. Expansion of the expansion material may increase a length of the first thermal expansion unit 102a. The expansion of the expansion material and/or the increase in length of the first thermal expansion unit 102a (that occurs while the first thermal expansion unit 102a is traveling along at least a portion of the first inner surface section 252, for example) applies a rotational force to the rotor 214. For example, expansion of the expansion material and/or the increase in length of the first thermal expansion unit 102a applies a force to a part of the first inner surface section 252 that the first thermal expansion unit 102a is in contact with, which pushes the first thermal expansion unit 102a and the rotor 214 in the direction of rotation 220 (e.g., the first thermal expansion unit 102a is pushed towards an area in which the first thermal expansion unit 102a has more room to continue increasing in length). In an example, the expansion of the expansion material may apply a force (e.g., pressure) to the rotational structure 202 (at the part of the first inner surface section 252 that the first thermal expansion unit 102a is in contact with, for example), wherein the force may create torque around the first axis of rotation 208 of the rotor 214, thereby causing the rotor 214 to rotate around the first axis of rotation 208. In some embodiments in which distances between points of the first inner surface section 252 and the first axis of rotation 208 increase along the direction of rotation 220, the first thermal expansion unit 102a has room to continue increasing in length while traveling across at least a portion of the first inner surface section 252. Accordingly, the first thermal expansion unit 102a may not become stuck even when it is at its largest length. It may be appreciated that the length of the offset 222 (and/or an eccentricity of the first axis of rotation 208 and/or the output shaft 224) may be configured based upon one or more dimensions and/or shapes of thermal expansion units of the plurality of thermal expansion units. For example, the length of the offset 222 (and/or the eccentricity of the first axis of rotation 208 and/or the output shaft 224) may be configured based upon a difference between a length 112 (shown in FIG. 1C) of the first thermal expansion unit 102a when the expansion material in the first thermal expansion unit 102a is in the contracted state and a length 116 (shown in FIG. 1D) of the first thermal expansion unit 102a when the expansion material is in the expanded state.

Figure 3A:
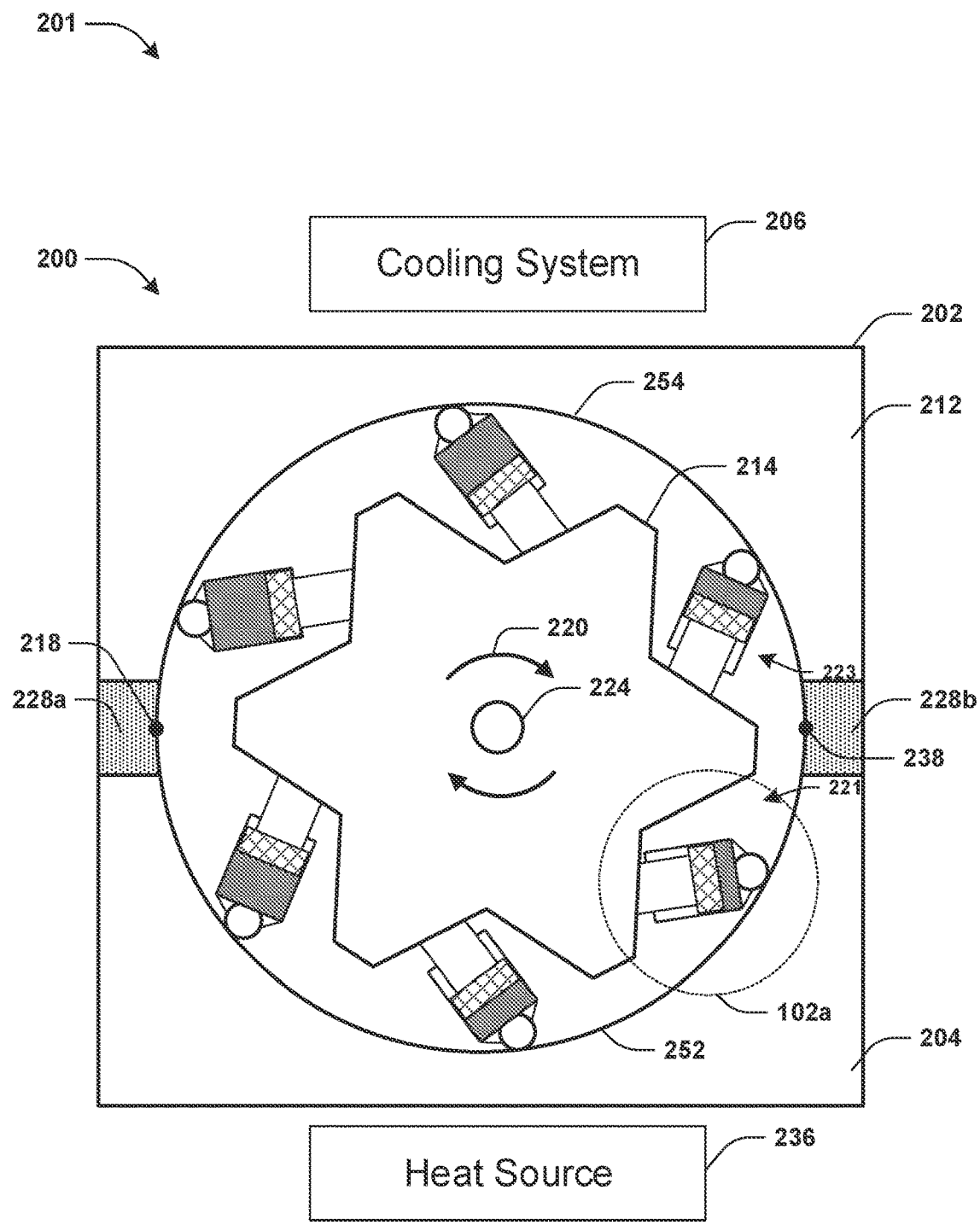
FIGS. 3A-3L are drawings illustrating examples of a rotation cycle of an engine, according to some embodiments.
Figure 3B:
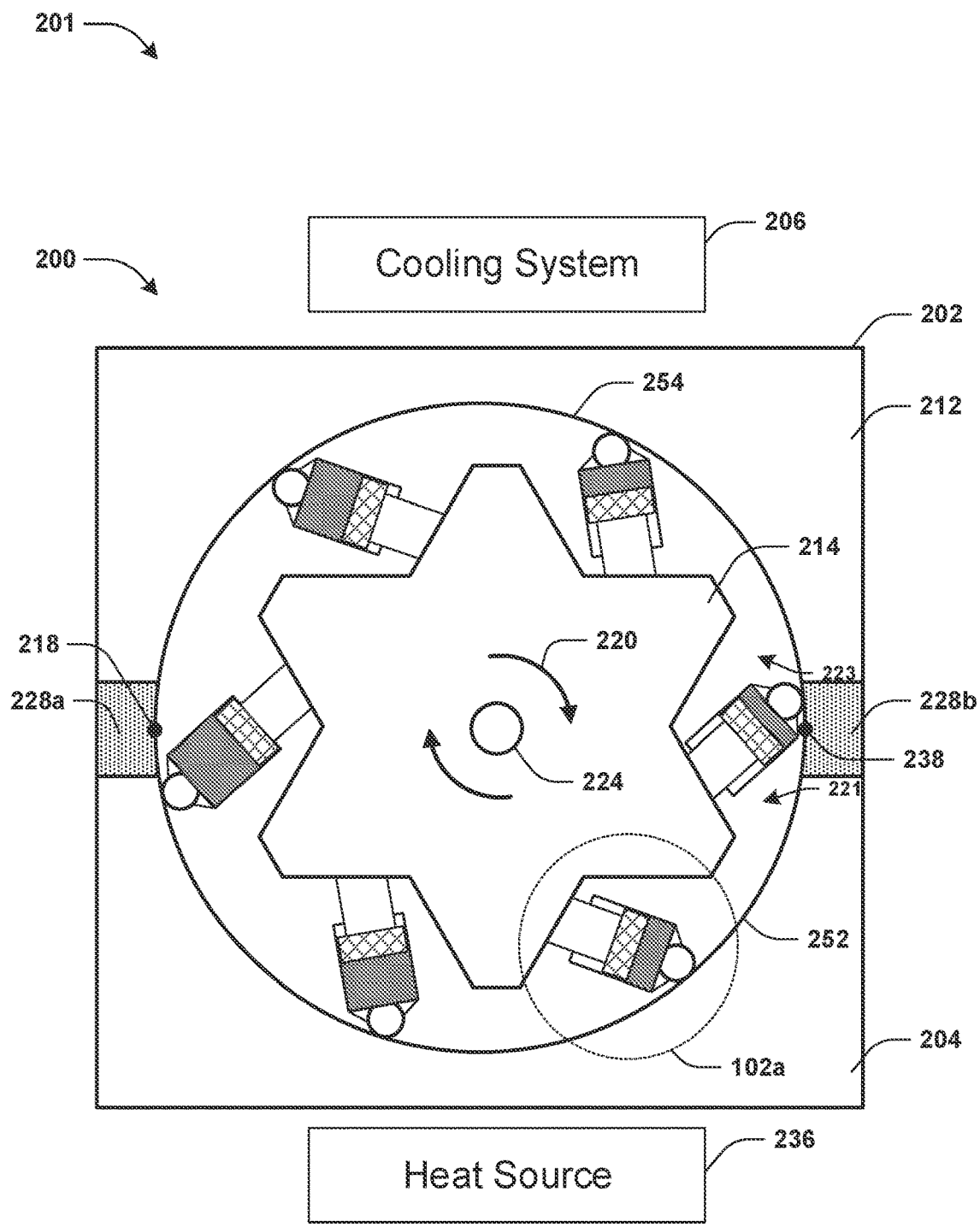
Figure 3C:
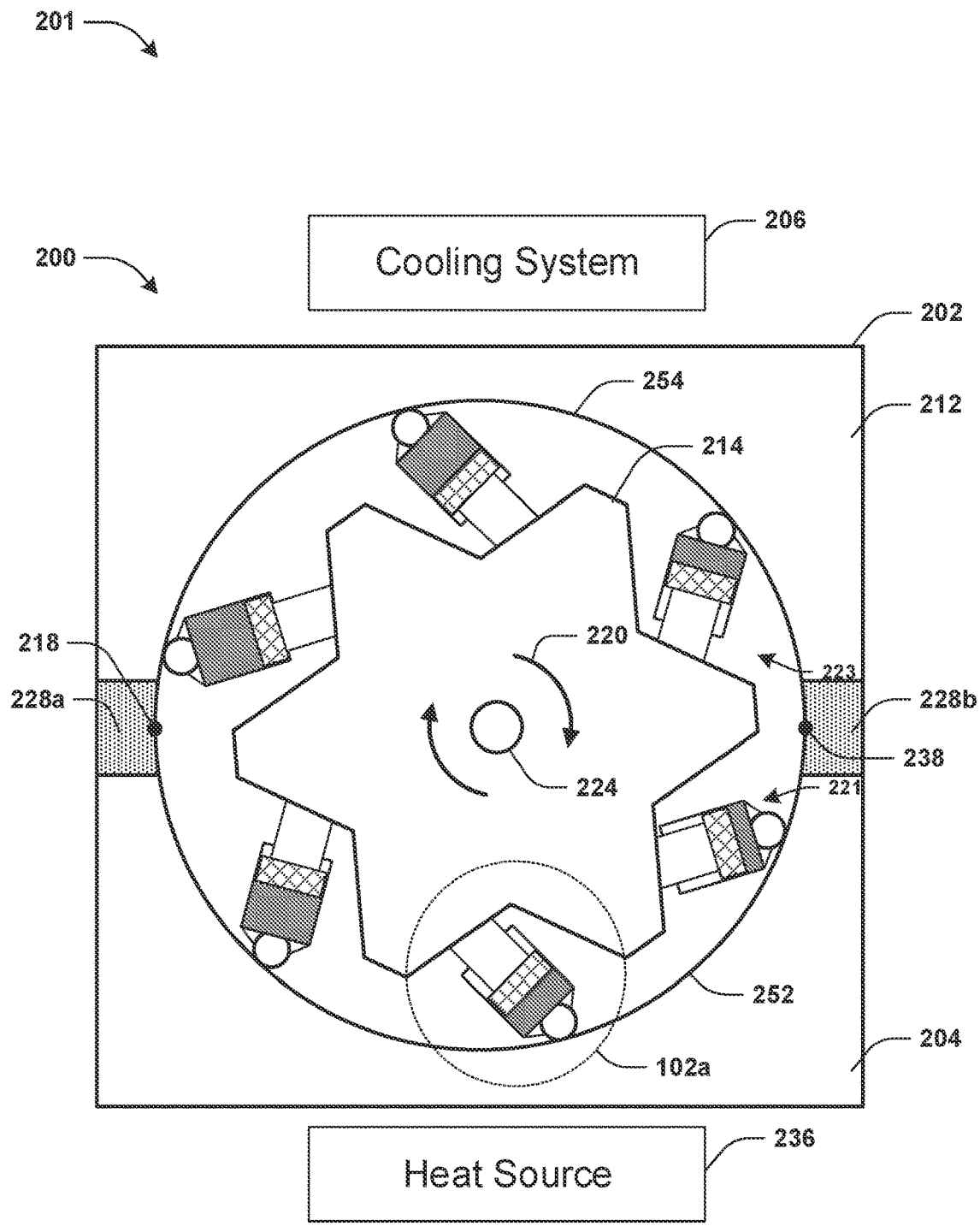
Figure 3D:
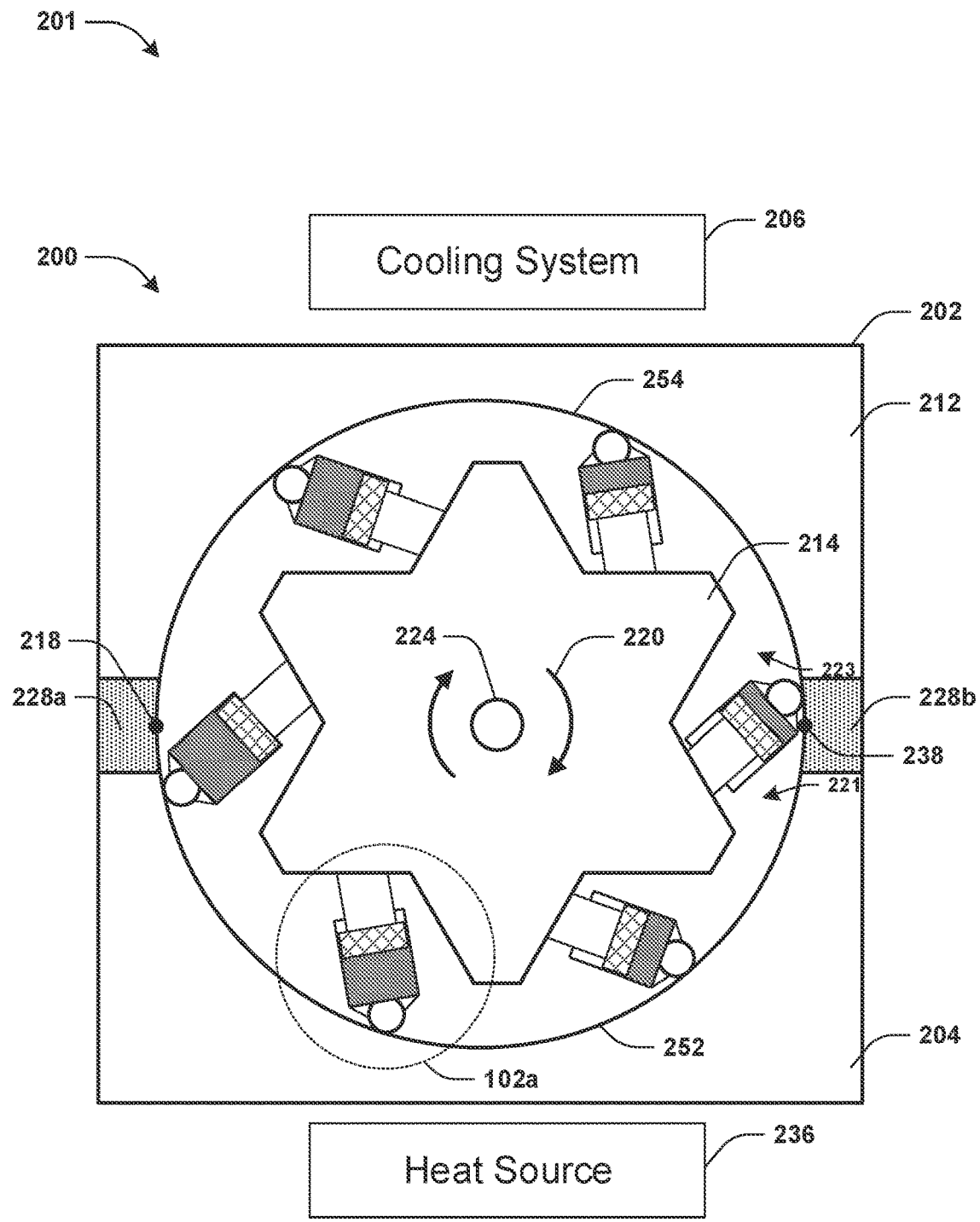
Figure 3E:
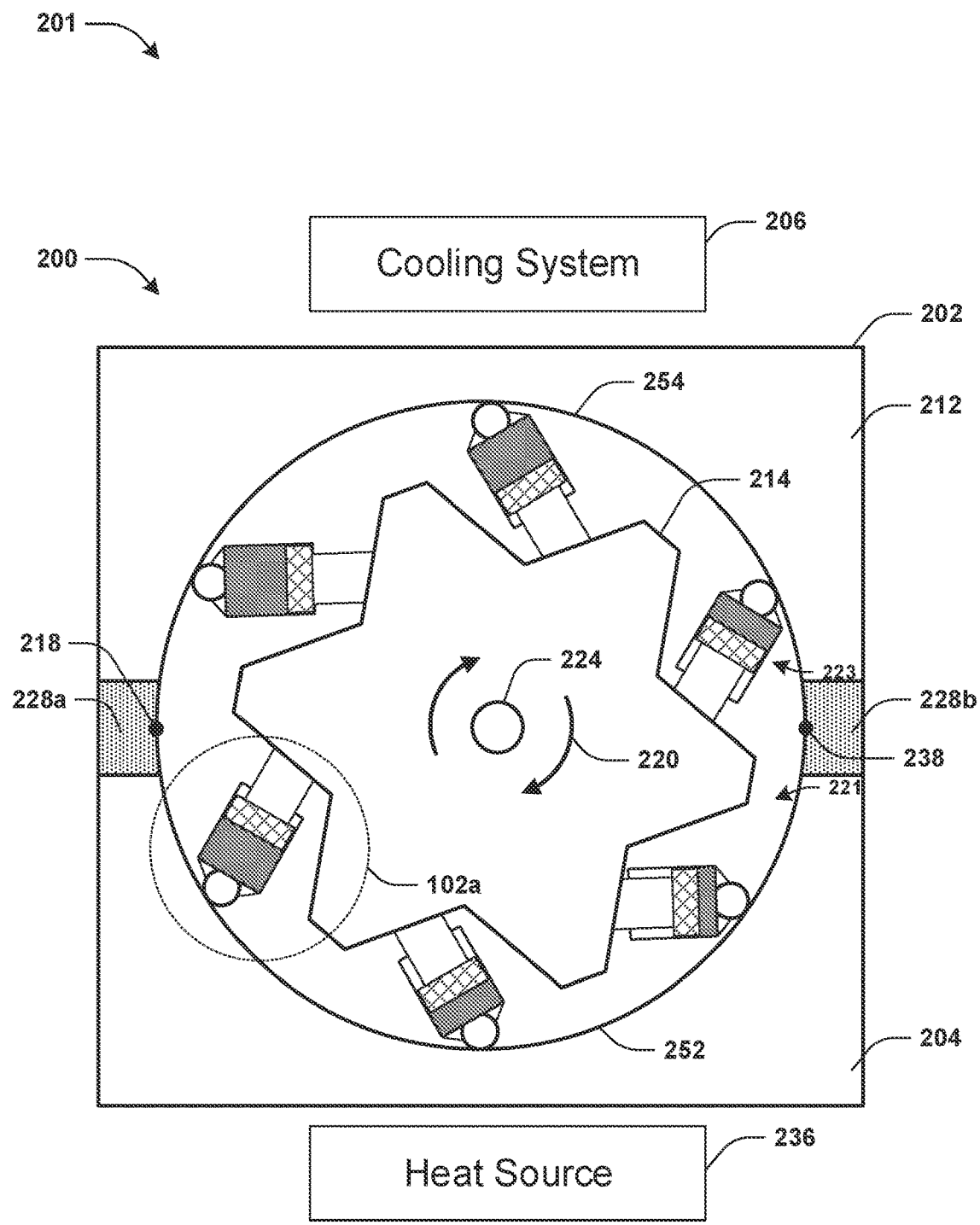
Figure 3F:
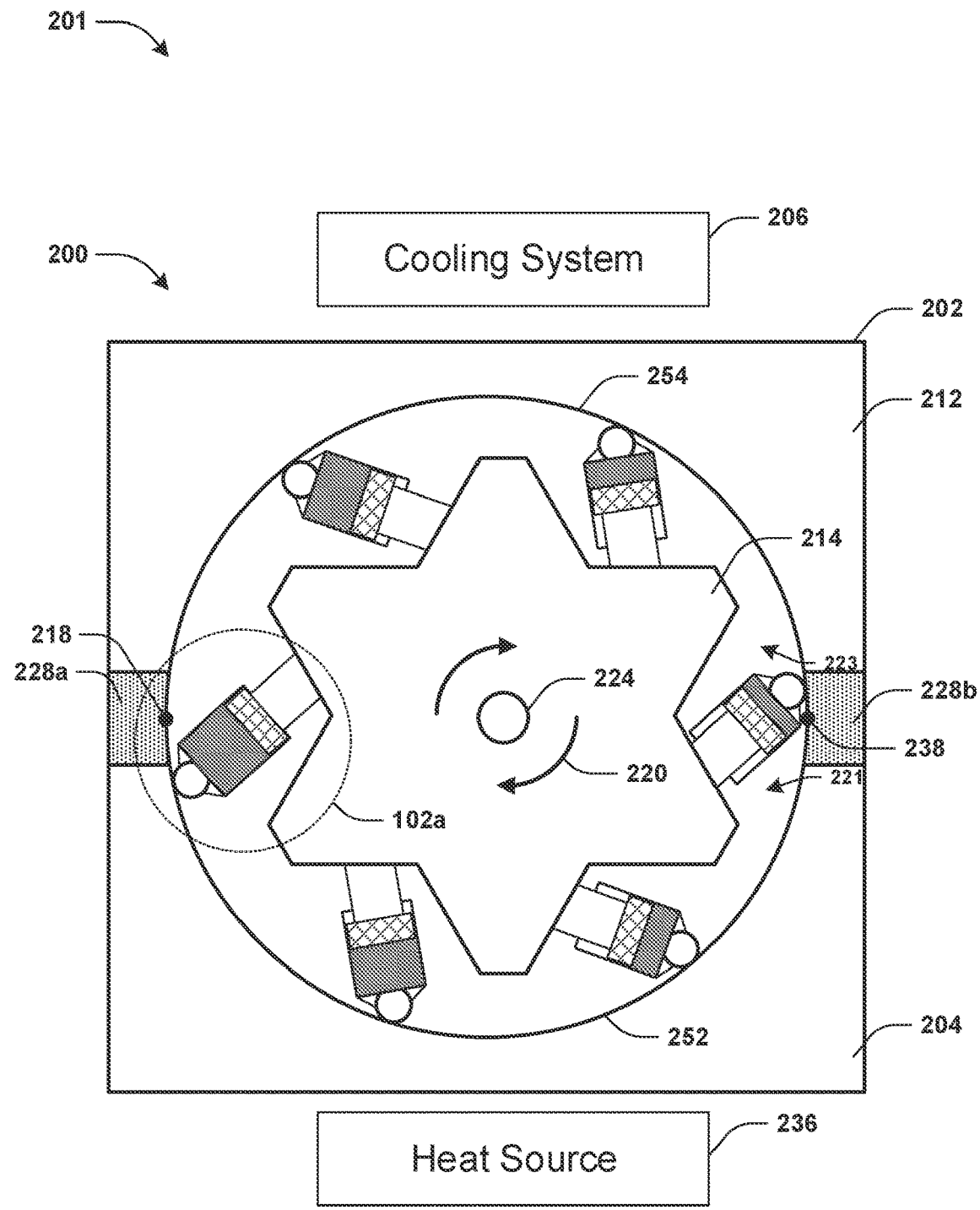
Figure 3G:
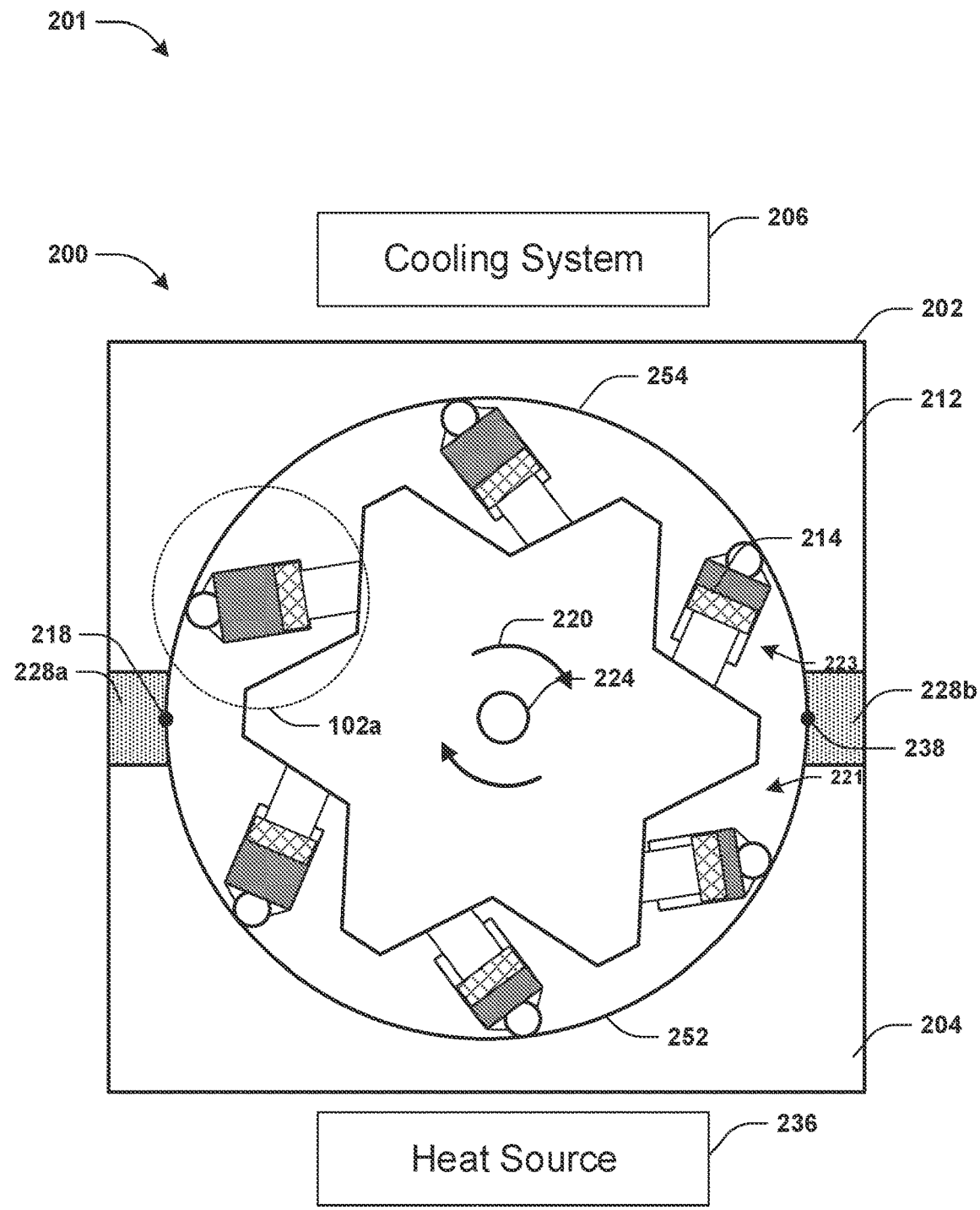
Figure 3H:
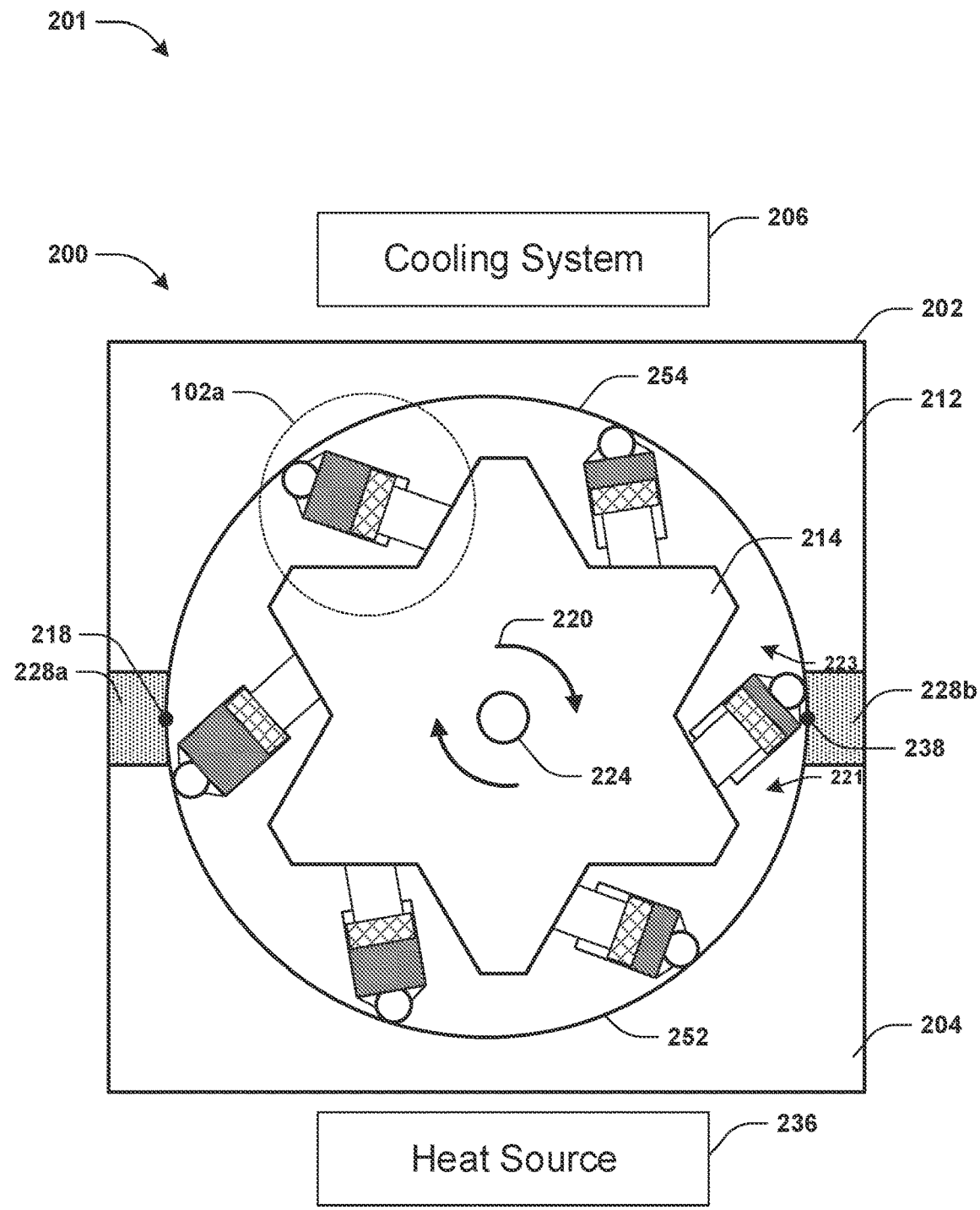
Figure 3I:
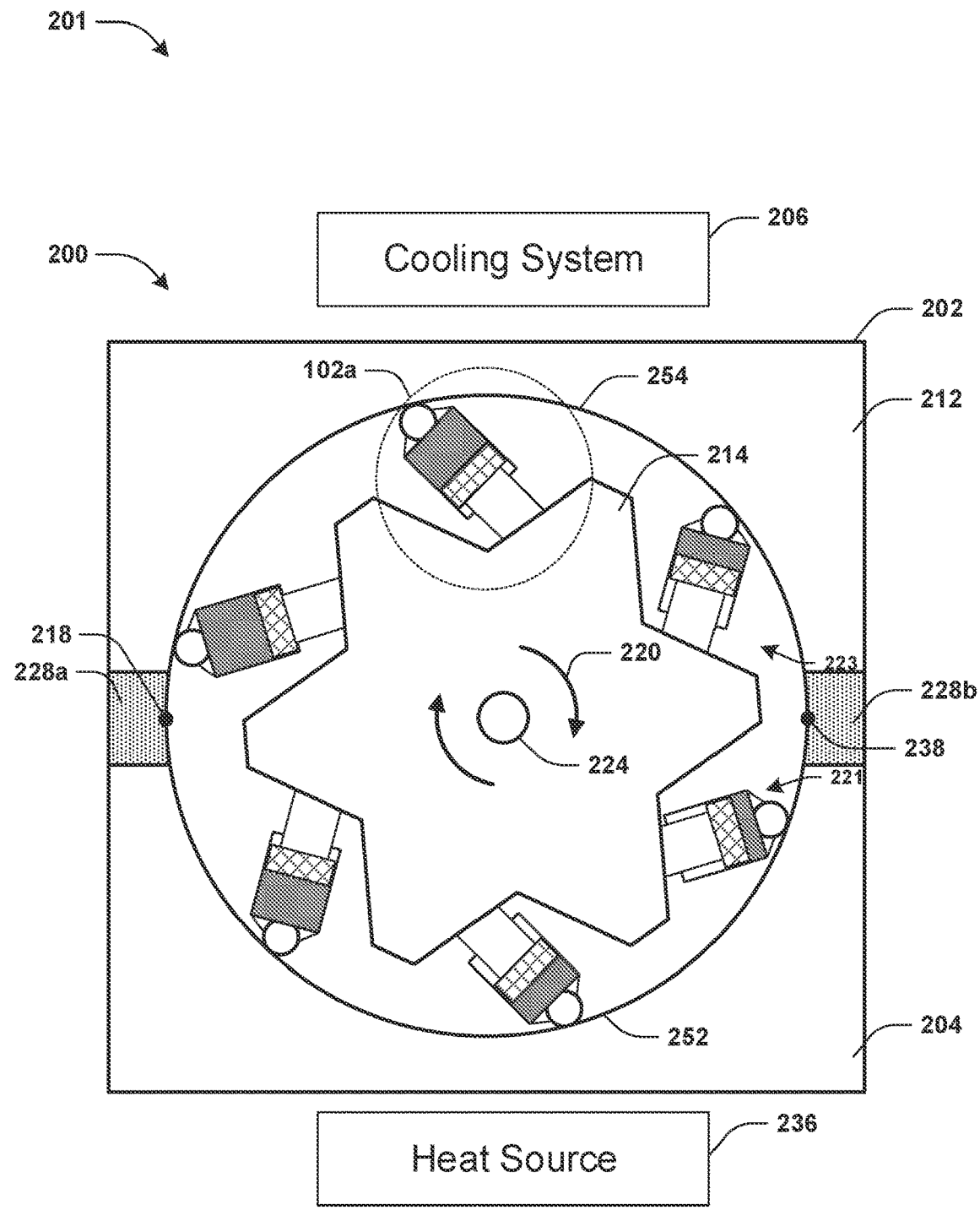
Figure 3J:
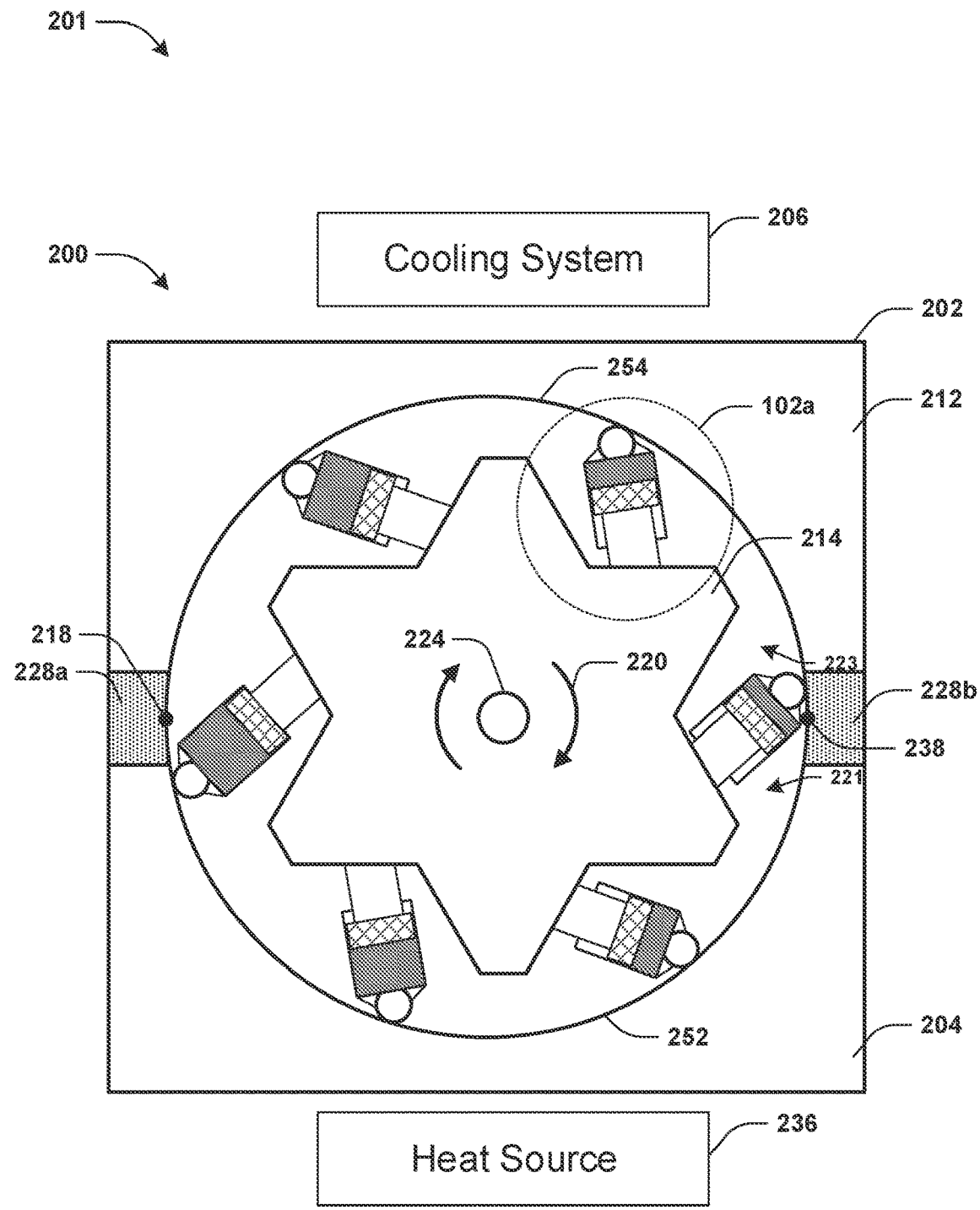
Figure 3K:
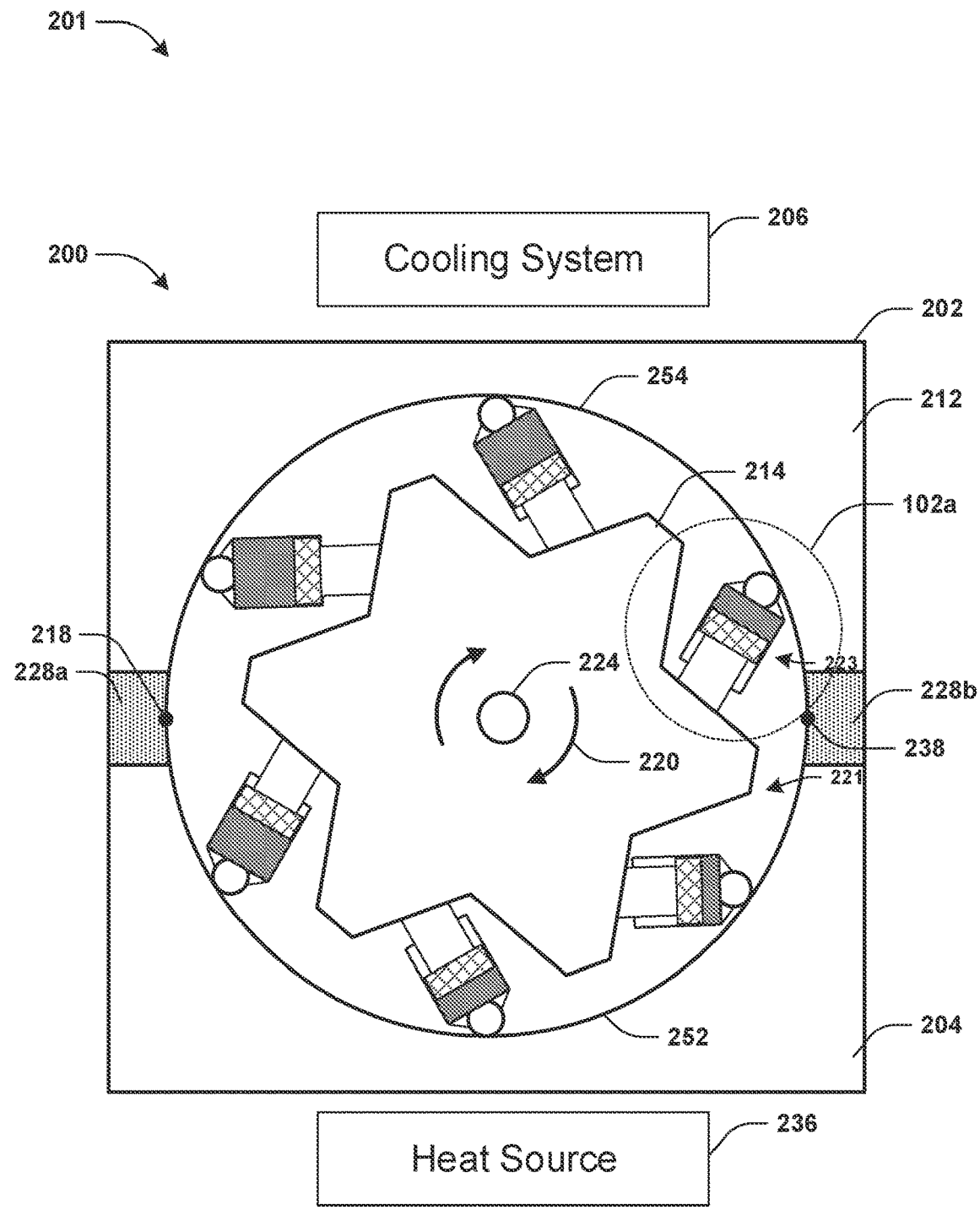

Between the instance shown in FIG. 3F and the instance shown in FIG. 3G, the first thermal expansion unit 102a may leave the first region 221 and enter the second region 223. In FIGS. 3G-3L, the first thermal expansion unit 102a is in the second region 223 and travels along the second inner surface section 254. For example, the bearing unit of the first thermal expansion unit 102a may be in contact with and/or may roll along the second inner surface section 254. In some embodiments, while traveling across at least a portion of the second inner surface section 254, expansion material in the first thermal expansion unit 102a contracts (e.g., continuously contracts while traveling across at least a portion of the second inner surface section 254). For example, the contraction (e.g., continuous contraction) of the expansion material may be due to: (i) a temperature of the expansion material decreasing as the first thermal expansion unit 102a travels across at least a portion of the second inner surface section 254; (ii) the first thermal expansion unit 102a being in contact with the (lower temperature) heat discharge region 212; and/or (iii) the first thermal expansion unit 102a being within the (lower temperature) second region 223. In an example, the expansion material may begin contracting when and/or after the first thermal expansion unit 102a enters the second region 223 and/or becomes in contact with the inner surface 215a (shown in FIG. 2A) of the heat discharge region 212. For example, the expansion material may begin cooling down as the first thermal expansion unit 102a enters the second region 223 and/or becomes in contact with the inner surface 215a of the heat discharge region 212, wherein the expansion material may begin contracting after the first thermal expansion unit 102a enters the second region 223 and/or becomes in contact with the inner surface 215a of the heat discharge region 212. In an example, the expansion material in the second inner surface section 254 begins to contract during, prior to and/or after the instance shown in FIG. 3G, and continues to contract (e.g., continuously) throughout the instances shown in FIGS. 3H-3L. Contraction of the expansion material and a force applied to the first thermal expansion unit 102a as the first thermal expansion unit 102a travels in contact with the second inner surface section 254 may decrease a length of the first thermal expansion unit 102a. The contraction of the expansion material and/or the decrease in length of the first thermal expansion unit 102a (that occurs while the first thermal expansion unit 102a is traveling along at least a portion of the second inner surface section 254, for example) allows the rotor 214 to rotate (e.g., the rotor 214 may continue to rotate due to force applied by expansion of expansion material of one or more other thermal expansion units that are within the first region 221). For example, contraction of the expansion material and/or the decrease in length of the first thermal expansion unit 102a enables the first thermal expansion unit 102a to continue traveling along the second inner surface section 254 without becoming stuck (even in embodiments in which distances between points of the second inner surface section 254 and the first axis of rotation 208 decrease along the direction of rotation 220).

Figure 3L:
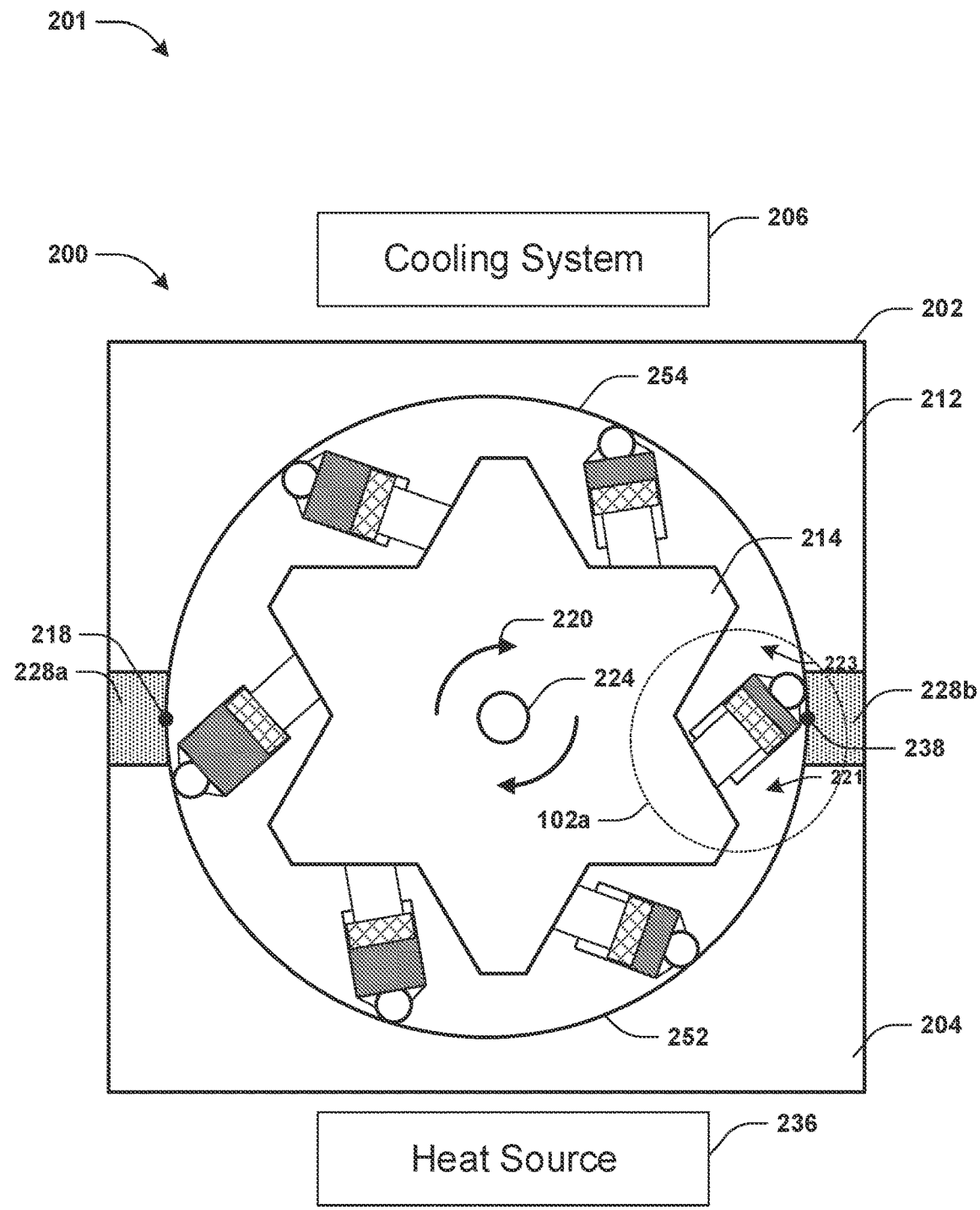

After the instance shown in FIG. 3L, the first thermal expansion unit 102a leaves the second region 223 and enters the first region 221 to complete the rotation cycle of the engine 200 and start a new rotation cycle, wherein rotation cycles may be repeated continuously to continue rotation of the rotor 214 and/or the plurality of thermal expansion units 102. For example, the rotation of the rotor 214 and/or the plurality of thermal expansion units 102 may continue while (e.g., as long as) sufficient temperature difference in the engine 200 is maintained (e.g., sufficient temperature difference between the first region 221 and the second region 223 and/or sufficient temperature difference between the heat receiving region 204 and the heat discharge region 212).

In some embodiments, thermal expansion units of the plurality of thermal expansion units 102 are coupled to each other through the first axis of rotation 208 (that is eccentric, for example). Alternatively and/or additionally, thermal expansion units of the plurality of thermal expansion units 102 may be coupled to the output shaft 224.

Embodiments are contemplated in which, rather than the rotational structure 202 comprising a single heat receiving region and/or a single heat discharge region, the rotational structure 202 comprises multiple heat receiving regions and/or multiple heat discharge regions, such as where, along the inner surface 215 of the rotational structure 202, regions alternate between heat receiving region and heat discharging region.

In some embodiments, a power system comprising the engine 200 is provided. In some embodiments, the power system may comprise a power unit. In some embodiments, the power unit may be configured to convert mechanical energy and/or torque applied by the engine 200 into electrical power (e.g., electrical energy and/or a different type of power). For example, the power unit may comprise a generator coupled to the output shaft 224 of the engine 200. Rotary motion (e.g., at least one of rotational motion, orbital motion, circular motion, etc.) of the output shaft 224 causes the generator to produce electrical power. In an example, the generator may convert (e.g., directly convert) rotary motion generated by the engine 200 to electrical power. In some embodiments, electrical power that is produced may be stored within an electricity storage device (e.g., a battery, for example) comprised within the power system. Alternatively and/or additionally, the generator and/or the power system may be connected to a power network such that electrical power that is produced may be transferred to the power network.

In some embodiments, multiple rotor/thermal expansion unit configurations may be combined together and/or connected to each other. For example, each rotor/thermal expansion unit configuration of the multiple rotor/thermal expansion unit configurations may be implemented using one or more of the techniques provided herein with respect to the rotor 214 and/or the plurality of thermal expansion units 102. In some embodiments, the multiple rotor/thermal expansion unit configurations may be connected in series. In some embodiments, output shafts of the multiple rotor/thermal expansion unit configurations may be coupled to each other. Alternatively and/or additionally, the multiple rotor/thermal expansion unit configurations may use a single output shaft (e.g., the output shaft 224 may be coupled to each rotor/thermal expansion unit configuration of the multiple rotor/thermal expansion unit configurations). In some embodiments, each rotor/thermal expansion unit configuration of the multiple rotor/thermal expansion unit configurations may be in a separate and/or individual rotational structure and/or engine. Alternatively and/or additionally, at least two rotor/thermal expansion unit configurations of the multiple rotor/thermal expansion unit configurations may be within the same rotational structure and/or the same engine. Increasing a quantity of rotor/thermal expansion unit configurations may increase at least one of a power, torque, etc. output using the multiple rotor/thermal expansion unit configurations.

Figure 4:
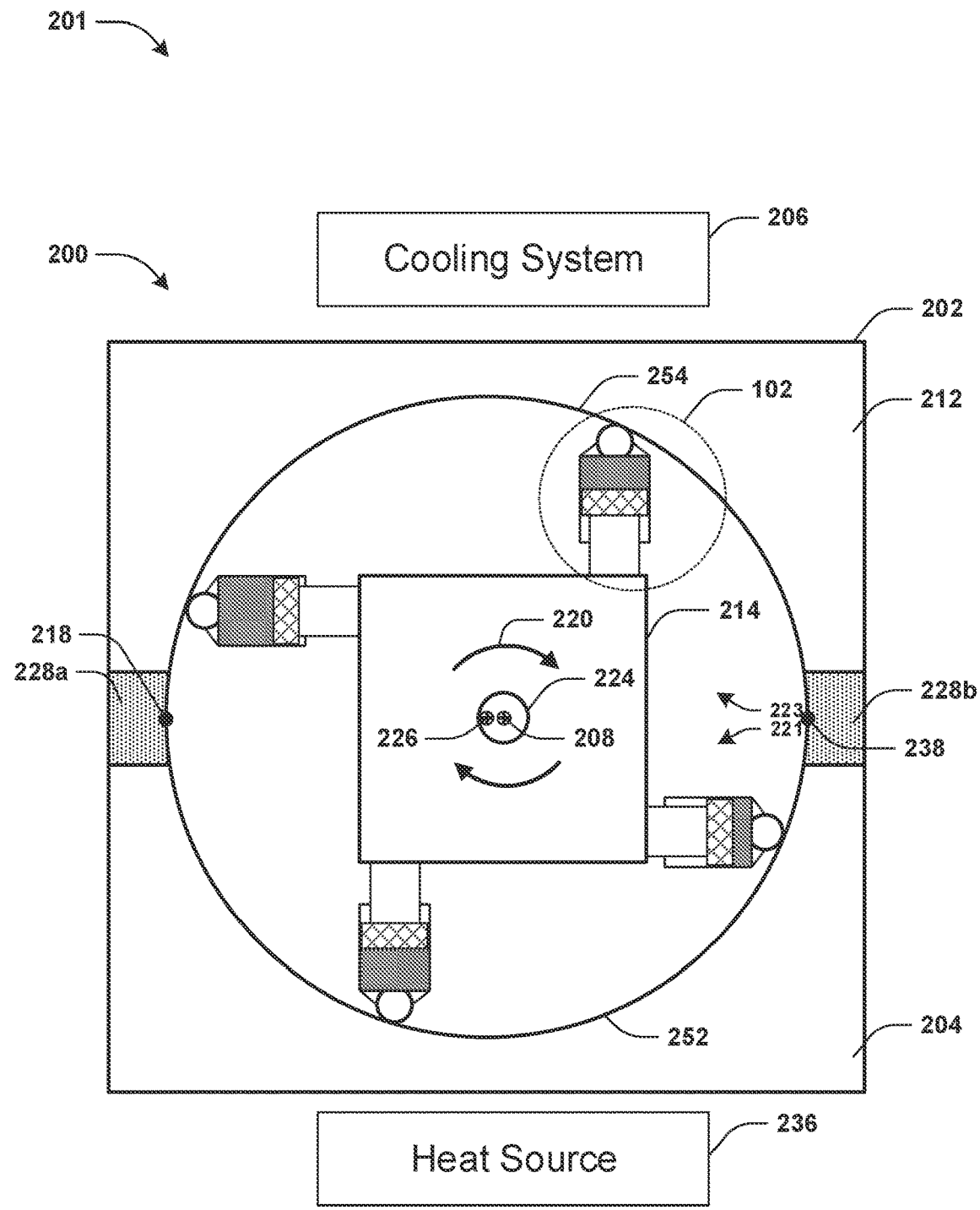
FIG. 4 is a drawing illustrating an example of an engine, according to some embodiments.
Figure 5:
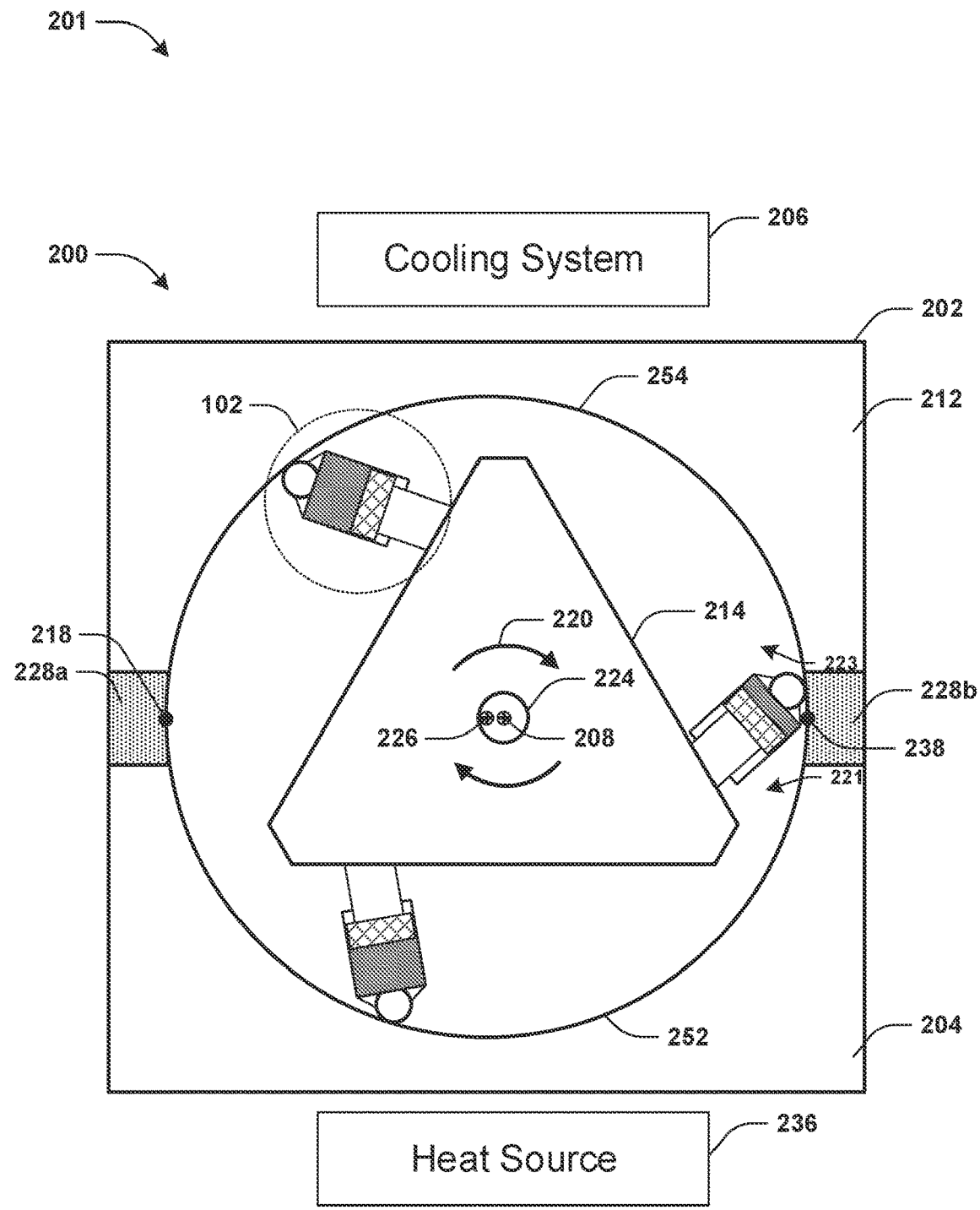
FIG. 5 is a drawing illustrating an example of an engine, according to some embodiments.
Figure 6:
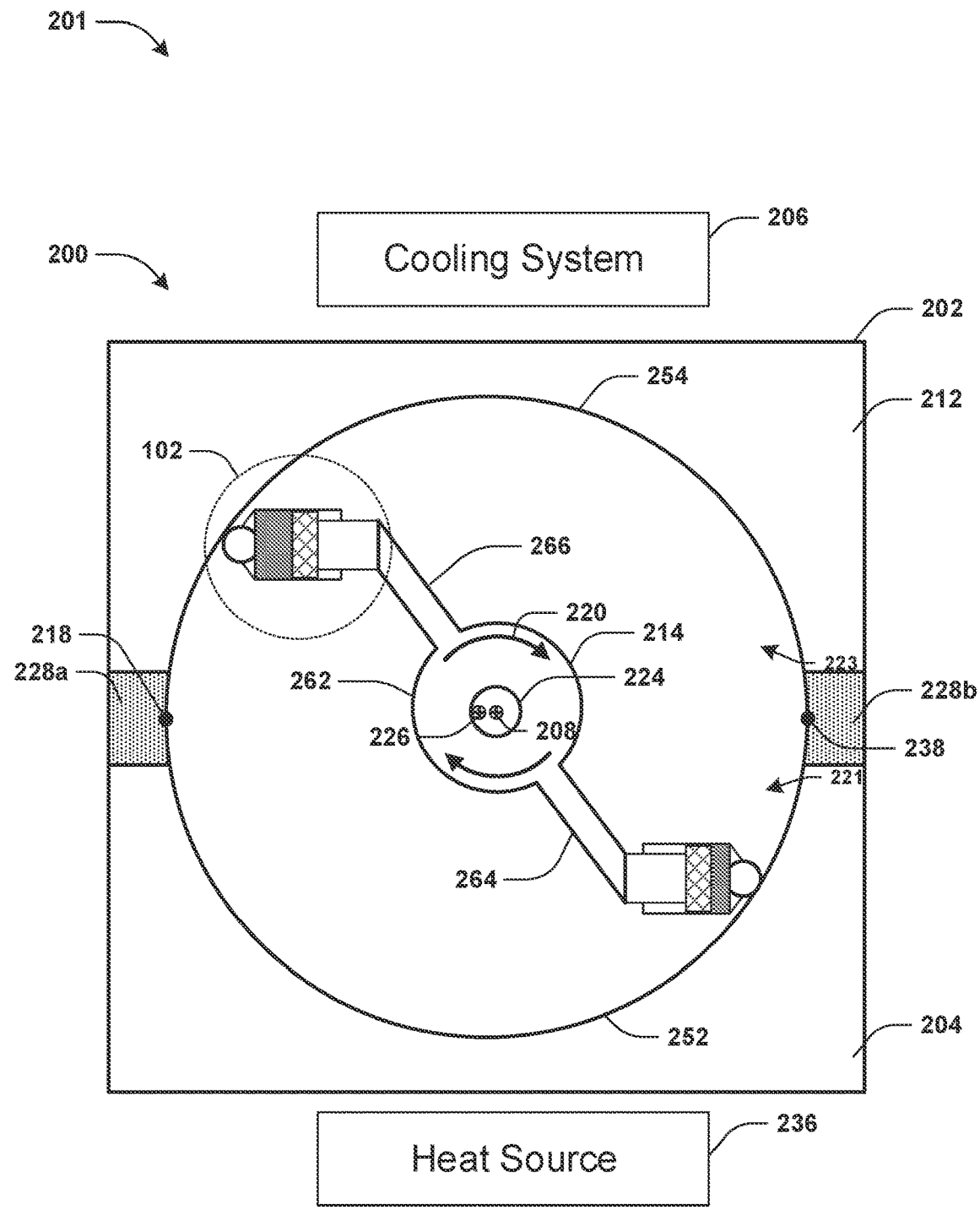
FIG. 6 is a drawing illustrating an example of an engine, according to some embodiments.

As shown in FIG. 2A, the rotor 214 may be star shaped and/or the plurality of thermal expansion units 102 may comprise six thermal expansion units. Embodiments are contemplated in which other shapes and/or other quantities of thermal expansion units are used. Some examples are shown in FIGS. 4-6. FIG. 4 illustrates an example of the engine 200 according to an embodiment in which the rotor 214 is square-shaped and/or the plurality of thermal expansion units 102 comprise four thermal expansion units. FIG. 5 illustrates an example of the engine 200 according to an embodiment in which the rotor 214 is triangle-shaped and/or the plurality of thermal expansion units 102 comprise three thermal expansion units. FIG. 6 illustrates an example of the engine 200 according to an embodiment in which the rotor 214 comprises a circle-shaped base 262 and a plurality of arms 264 and 266 (e.g., two arms) extending from the circle-shaped base 262, wherein the plurality of thermal expansion units 102 comprise two thermal expansion units and each thermal expansion unit of the plurality of thermal expansion units 102 is coupled to an arm of the plurality of arms. Embodiments are contemplated in which the plurality of arms comprises more than two arms and/or the plurality of thermal expansion units 102 comprise more than two thermal expansion units (e.g, where each thermal expansion unit is coupled to an arm of the plurality of arms, respectively).

Figure 7:
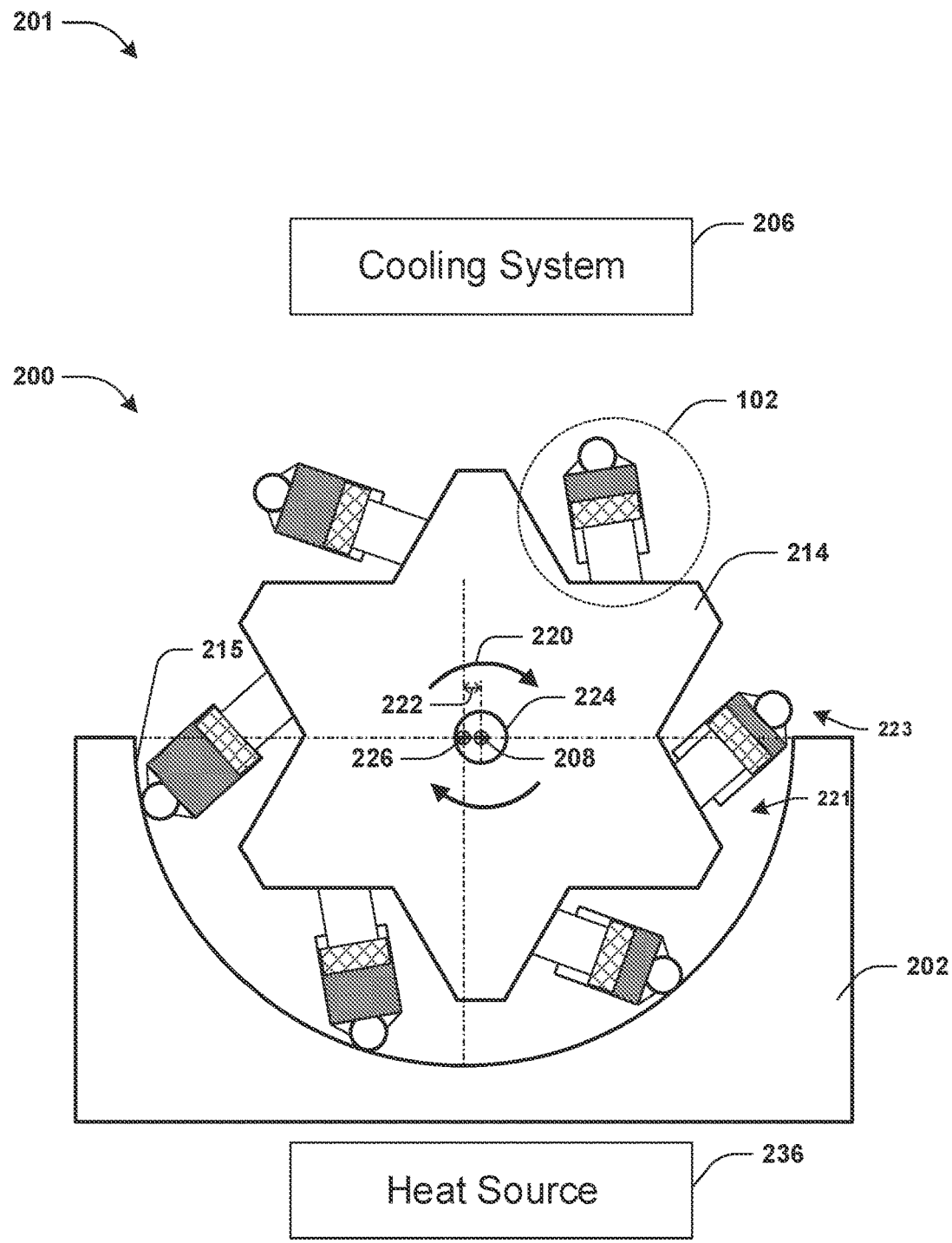
FIG. 7 is a drawing illustrating an example of an engine, according to some embodiments.

Embodiments are provided in which the inner surface 215 of the rotational structure 202 does not define a full circle or a full ellipse and/or does not cover at least a portion of the rotor 214 and/or one or more thermal expansion units of the plurality of thermal expansion units 102. FIG. 7 illustrates an example of the engine 200 in which the rotational structure 202 does not surround the entirety of the rotor 214 and/or the plurality of thermal expansion units 102, according to some embodiments. For example, the inner surface 215 of the rotational structure 202 may form merely a part of a circle or a part of an ellipse, such as a half circle or a half ellipse. In some embodiments, thermal expansion units that are in the second region 223 may be exposed to surrounding environment (e.g., the second region 223 may not be covered by the rotational structure 202). In some embodiments, thermal expansion units within the first region 221 may be heated using one or more of the techniques described herein with respect to FIG. 2A. Accordingly, due to the thermal expansion units within the first region 221 being heated, the thermal expansion units may expand while traveling along at least a portion of the inner surface 215 of the rotational structure 202, thereby causing the rotor 214 to rotate in the direction of rotation 220. A temperature of a thermal expansion unit may decrease when the thermal expansion unit is in the second region 223. For example, a cooling system may be used to decrease the temperature of thermal expansion units within the second region 223. Alternatively and/or additionally, the temperature of thermal expansion units within the second region 223 may be decreased by fluid (e.g., gas, cooled gas, air, cooled air, liquid, cooled liquid, etc.) surrounding the thermal expansion units when the thermal expansion units are in the second region 223. In some embodiments, an air circulation device (e.g., a cooler, a fan, etc.) may be used to direct the flow of air and/or other gas to the thermal expansion units in the second region 223 to decrease the temperature of the thermal expansion units within the second region 223. The decrease in temperature may cause expansion material in the thermal expansion units to contract while the thermal expansion units travel through the second region 223.

FIGS. 8A-8D illustrate examples of a system 801 comprising an engine 800, such as a thermal differential engine and/or a heat engine, according to some embodiments. In an example, the engine 800 may comprise a reciprocal heat engine (e.g., a linear heat engine). The engine 800 may comprise a thermal expansion unit 102, a force introducing unit 828, a switch assembly and/or a housing structure 803 (e.g., an engine body and/or a frame) in which the switch assembly and/or at least a portion of the thermal expansion unit 102 are disposed. In some embodiments, the force introducing unit 828 is configured to apply a force to the shaft 104 in a first direction 805 (e.g., a first linear direction), such as a direction towards the shaft 104.

In some embodiments, the housing structure 803 may comprise a first wall 840 and a second wall 838, wherein the thermal expansion unit 102 may be between the first wall 840 and the second wall 838. In an example, the first wall 840 may be adjacent to and/or in contact with a first end of the thermal expansion unit 102 (e.g., the first wall 840 may be in contact with the cylinder 106 of the thermal expansion unit 102 in which the expansion material 108 is disposed). In some embodiments, the first wall 840 and/or the second wall 838 may comprise thermal insulation material (e.g., material configured to provide thermal insulation).

The housing structure 803 comprises a heat receiving region 812, a heat discharge region 810, and/or an insulation region 814. In some embodiments, at least some of the housing structure 803, such as the heat receiving region 812 and/or the heat discharge region 810, may be made of one or more metals and/or one or more metal alloys (e.g., the heat receiving region 812 and/or the heat discharge region 810 of the housing structure 803 may be made of steel). In some embodiments, the insulation region 814 is between the heat receiving region 812 and the heat discharge region 810. The insulation region 814 may comprise thermal insulation to mitigate and/or prevent direct heat transfer between the heat receiving region 812 and the heat discharge region 810. In some embodiments, the insulation region 814 may comprise polytetrafluoroethylene (PTFE) (e.g., Teflon), insulation foam, and/or one or more other materials that provide thermal insulation. In some embodiments, the insulation region 814 may assist in maintaining a temperature difference between the heat receiving region 812 and the heat discharge region 810, and/or the insulation region 814 may prevent the heat receiving region 812 and the heat discharge region 810 from reaching thermal equilibrium.

In some embodiments, a first temperature of the heat receiving region 812 may be higher than a second temperature of the heat discharge region 810. In an example, the first temperature of the heat receiving region 812 may be within or greater than the higher temperature range (e.g., the temperature range in which the expansion material expands and/or is in an expanded state). In an example, the second temperature of the heat discharge region 810 may be within or lower than the lower temperature range (e.g., the temperature range in which the expansion material contracts and/or is in a contracted state). In an example, the first temperature of the heat receiving region 812 may be increased and/or maintained using a heat source 804 (e.g., a source of thermal energy) that is configured to transfer thermal energy 808 to the heat receiving region 812, wherein at least some of the thermal energy 808 may be transferred to the expansion material 108 within the thermal expansion unit 102. In some embodiments, the heat source 804 may be implemented and/or used to heat the heat receiving region 812 using one or more of the techniques provided herein with respect to the heat source 236 (shown in FIGS. 2A-7). In an example, the second temperature of the heat discharge region 810 may be decreased and/or maintained using a cooling system 802 that is configured to transfer thermal energy 806 from the heat discharge region 810 to outside the heat discharge region 810, wherein at least some of the thermal energy 806 may be transferred from the expansion material 108 within the thermal expansion unit 102 to outside the heat discharge region 810. In some embodiments, the cooling system 802 may be implemented and/or used to cool the heat discharge region 810 using one or more of the techniques provided herein with respect to the cooling system 206.

The switch assembly may be configured to switch between a first state and a second state. When the switch assembly is in the first state, the switch assembly is configured to transfer thermal energy from the heat source 804 to the expansion material 108 within the thermal expansion unit 102, wherein the transfer of thermal energy from the heat source 804 to the expansion material 108 causes expansion of the expansion material 108. For example, when the switch assembly is in the first state, a first thermal energy transference path through which thermal energy is transferred from the heat receiving region 812 to the expansion material 108 may be established (e.g., thermal energy from the heat source 804 may be transferred to the expansion material 108 via the heat receiving region 812 and/or the first thermal energy transference path). In some embodiments, the expansion material 108 may expand due to a temperature of the expansion material being sufficiently high (e.g., within or higher than the higher temperature range) to expand when thermal energy is transferred from the heat source 804 to the expansion material 108 (via the first thermal energy transference path, for example). The expansion of the expansion material 108 causes the shaft 104 of the thermal expansion unit 102 to move in a second direction 807 (e.g., a second linear direction), opposite the first direction 805, from a first position x1 (shown in FIG. 8A) to a second position x2 (shown in FIG. 8B). In some embodiments, the expansion material 108 may expand (e.g., fully expand) until the shaft 104 reaches a maximum distance (e.g., maximum predetermined distance) from the cylinder 106, wherein the second position x2 may correspond to a position at which the expansion material 108 is the maximum distance from the cylinder 106. For example, the expansion material 108 may expand (e.g., fully expand) until the length of the thermal expansion unit 102 reaches a maximum length (e.g., maximum predetermined length) of the thermal expansion unit 102 (e.g., the second position x2 may correspond to a position of the shaft 104 when the thermal expansion unit 102 is at its maximum length). In some embodiments, the first thermal energy transference path and/or the second thermal energy transference path may be established using a thermal energy transference unit 836 of the switch assembly. The thermal energy transference unit 836 may be in contact with the thermal expansion unit 102.

Alternatively and/or additionally, when the switch assembly is in the second state, the switch assembly is configured to transfer thermal energy from the expansion material 108 within the thermal expansion unit 102 to outside of the expansion material 108 (such as to outside of the thermal expansion unit 102 and/or outside the housing structure 803), wherein the transfer of thermal energy from the expansion material 108 to outside of the expansion material 108 causes contraction of the expansion material 108. For example, when the switch assembly is in the second state, a second thermal energy transference path through which thermal energy is transferred from the expansion material 108 to the heat discharge region 810 may be established (e.g., thermal energy from the expansion material 108 may be transferred to the heat discharge region 810 via the second thermal energy transference path, wherein the thermal energy may be transferred to outside the heat discharge region 810 such as using the cooling system 802). In some embodiments, the expansion material 108 may contract due to a temperature of the expansion material being sufficiently low (e.g., within or lower than the lower temperature range) to contract when thermal energy is transferred from the expansion material 108 to outside the expansion material 108 (via the second thermal energy transference path, for example). The contraction of the expansion material 108 and/or the force applied by the force introducing unit 828 cause the shaft 104 of the thermal expansion unit 102 to move in the first direction 805, such as from the second position x2 to the first position x1. In some embodiments, the shaft 104 may move (e.g., be forced using the force introducing unit 828) in the first direction 805 until the shaft 104 reaches a minimum distance (e.g., minimum predetermined distance) from the cylinder 106, wherein the first position x1 may correspond to a position at which the expansion material 108 is the minimum distance from the cylinder 106. For example, the expansion material 108 may decrease in length (as a result of the contraction of the expansion material 108 and/or the force of the force introducing unit 828 applied to the thermal expansion unit 102, for example) until the length of the thermal expansion unit 102 reaches a minimum length (e.g., minimum predetermined length) of the thermal expansion unit 102 and/or until the length of the thermal expansion unit 102 reaches an initial length, such as a length of the thermal expansion unit 102 prior to expanding as a result of thermal energy transferred from the heat receiving region 812 (e.g., the first position x1 may correspond to a position of the shaft 104 when the thermal expansion unit 102 is at its minimum length and/or at its initial length). In some embodiments, the contraction of the expansion material 108 allows the force applied by the force introducing unit 828 to displace the shaft 104, such as move the shaft 104 of the thermal expansion unit 102 in the first direction 805 (e.g., from the second position x2 to the first position x1).

In some embodiments, the engine 800 generates reciprocating (e.g., linear and/or back-and-forth) motion of the shaft 104 of the thermal expansion unit 102. The reciprocating motion may be achieved by way of cycling between expansion and contraction of the expansion material 108, and/or application of force to the shaft 104 using the force introducing unit 828. For example, the switch assembly may switch between the first state (in which thermal energy is transferred from the heat source 804 to the expansion material 108, for example) and the second state (in which thermal energy is transferred from the expansion material 108 to outside the expansion material 108, for example) such that the shaft 104 moves back-and-forth (e.g., moves in the first direction 805 and the second direction 807).

In some embodiments, the switch assembly is configured to switch from the first state (in which thermal energy is transferred from the heat source 804 to the expansion material 108, for example) to the second state (in which thermal energy is transferred from the expansion material 108 to outside the expansion material 108, for example) during movement of the shaft 104 in the second direction 807 and/or when the shaft 104 reaches the second position x2 or reaches a third position between the first position x1 and the second position x2.

In some embodiments, the switch assembly is configured to switch from the second state (in which thermal energy is transferred from the expansion material 108 to outside the expansion material 108, for example) to the first state (in which thermal energy is transferred from the heat source 804 to the expansion material 108, for example) during movement of the shaft 104 in the first direction 805 and/or when the shaft 104 reaches the first position x1 or reaches a fourth position between the first position x1 and the second position x2.

Figure 8A:
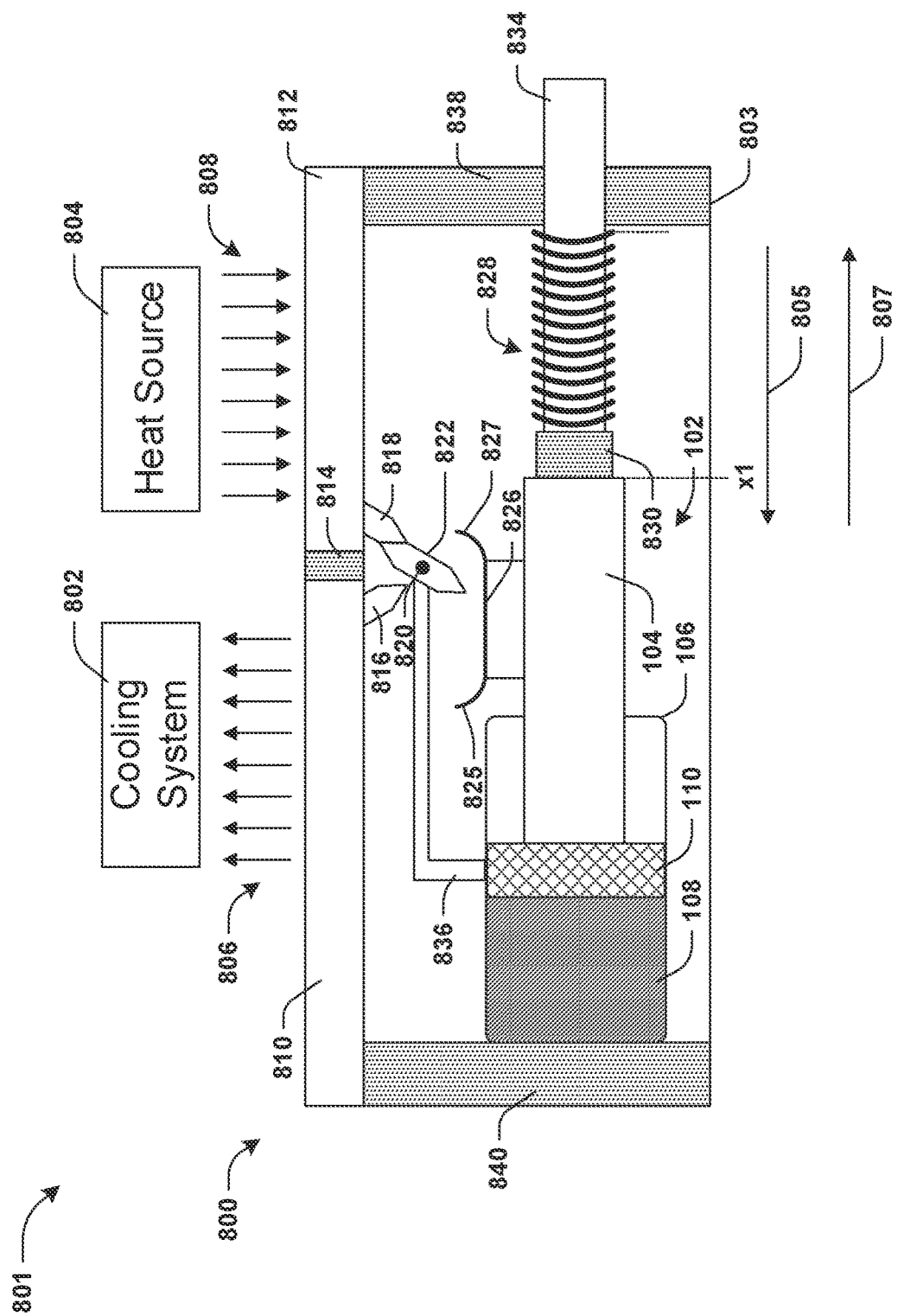
FIGS. 8A-8D are drawings illustrating examples of an engine, according to some embodiments.
Figure 8B:
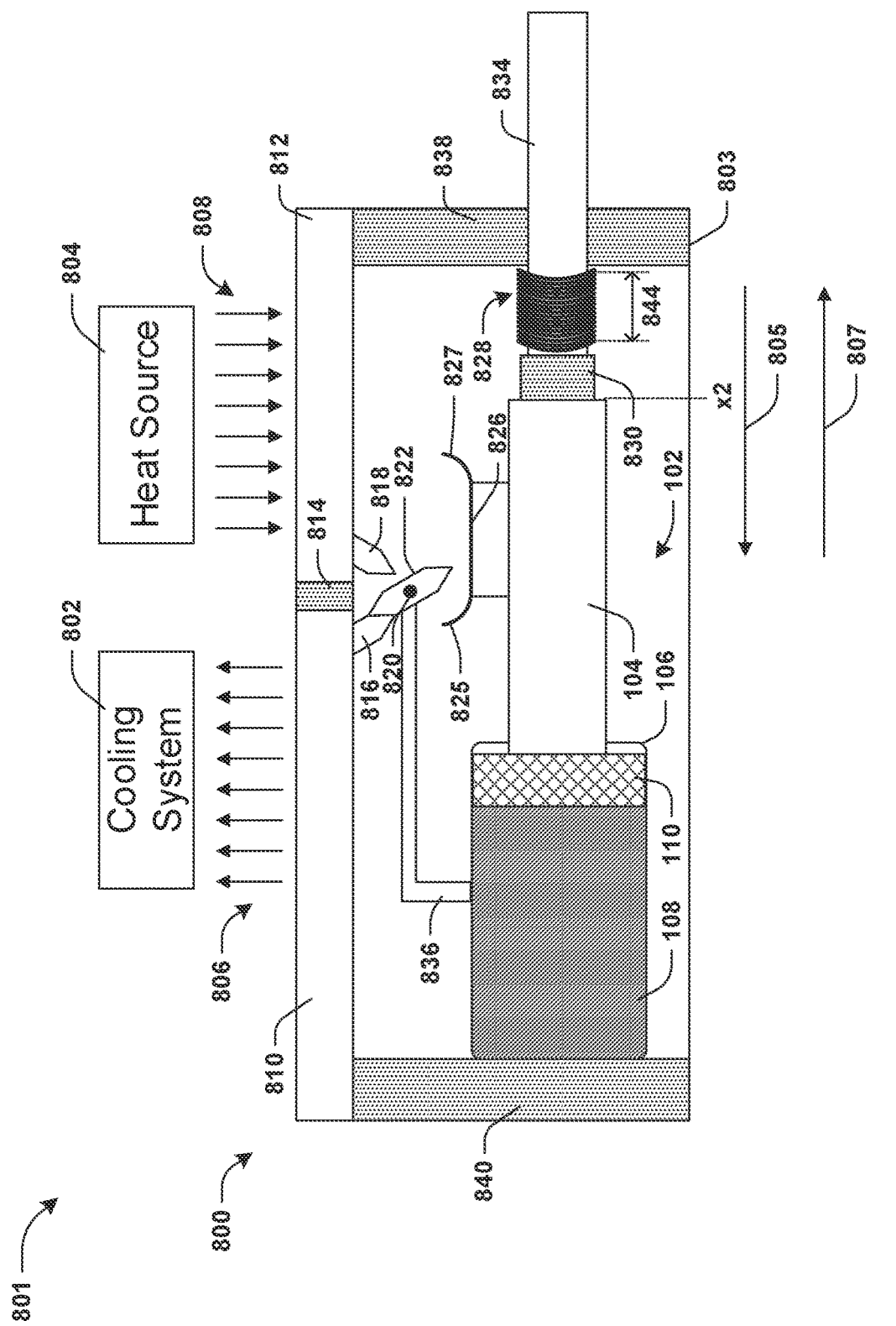

In some embodiments, the force introducing unit 828 comprises a mechanical energy storing device (e.g., a component that absorbs and/or stores mechanical energy), such as a spring (e.g., a coil spring) and/or other component. In an example, the mechanical energy storing unit may absorb mechanical energy from the shaft 104 as the expansion material 108 expands and/or the shaft 104 moves in the second direction 807. The mechanical energy may be stored by the mechanical energy storing unit. When the expansion material 108 is contracting, the mechanical energy storing unit may use the stored mechanical energy to force the shaft 104 to move in the first direction 805. In an example in which the force introducing unit 828 comprises the spring (such as shown in FIGS. 8A-8B), the spring may be compressed as the expansion material 108 expands and/or the shaft 104 moves in the second direction 807. When the expansion material 108 is contracting, an opposing force exerted by the compressed spring may displace the shaft 104 (e.g., the compressed spring may apply a force in the first direction 805 that moves the shaft 104 in the first direction 805, such as from the second position x2 to the first position x1). In some embodiments, the spring may be positioned between the second wall 838 and the shaft 104, such as between the second wall 838 and an insulation structure 830. In an example, a first end of the spring may be in contact with the insulation structure 830 and a second end of the spring may be in contact with the second wall 838. In some embodiments, an output shaft 834 (e.g., an extension shaft) is coupled to (e.g., affixed to) the shaft 104, wherein at least a portion of the output shaft 834 extends through the spring. The output shaft 834 may be coupled to the shaft 104 via being coupled to the insulation structure 830. In some embodiments, the insulation structure 830 may be between the shaft 104 and the output shaft 834 and/or may provide thermal insulation between the shaft 104 and the output shaft 834. For example, the insulation structure 830 may comprise polytetrafluoroethylene (PTFE) (e.g., Teflon), insulation foam, and/or one or more other materials that provide thermal insulation. The output shaft 834 may extend to outside the housing structure 803 such that reciprocating motion of the output shaft 834 may be generated and/or used outside the housing structure 803.

In some embodiments, such as shown in FIGS. 8A-8D, the switch assembly comprises the thermal energy transference unit 836, a switch 822, and/or a trigger unit 826 configured to operate the switch 822. The thermal energy transference unit 836 is coupled to (e.g., in direct contact with) the switch 822. A hinge (and/or pin) 820 may be used to maintain a position of the switch 822. The switch 822 may be connectable to the heat receiving region 812 and the heat discharge region 810 (e.g., the switch 822 may be positioned such that the switch 822 can be connected to the heat receiving region 812 and, separately, be connected to the heat discharge region 810). The trigger unit 826 may be coupled to (e.g., affixed to) the thermal expansion unit 102 and/or may move in the second direction 807 when the thermal expansion unit 102 increases in length and/or may move in the first direction 805 when the thermal expansion unit 102 decreases in length. In an example, the trigger unit 826 is coupled to (e.g., affixed to) the shaft 104 of the thermal expansion unit 102. Accordingly, when the shaft 104 moves in the second direction 807, the trigger unit 826 may also move in the second direction 807, and/or when the shaft 104 moves in the first direction 805, the trigger unit 826 may also move in the first direction 805. In some embodiments, during movement of the shaft 104 in the first direction 805 or the second direction 807, the trigger unit 826 may actuate the switch 822 to change the state of the switch assembly.

FIGS. 8A-8B illustrate an example scenario in which the switch assembly changes from the first state to the second state. FIG. 8A illustrates the engine 800 when the switch assembly is in the first state. In some embodiments, when the switch assembly is in the first state, thermal energy is transferred from the heat source 804 to the expansion material 108 via the first thermal energy transference path. For example, the first thermal energy transference path may be established through the switch 822 and/or the thermal energy transference unit 836. In an example, the first thermal energy transference path may provide transfer of thermal energy from the heat receiving region 812 in contact with a switch component 818, through the switch component 818 in contact with the switch 822, through the switch 822 in contact with the thermal energy transference unit 836, through the thermal energy transference unit 836 in contact with the thermal expansion unit 102, and/or to the expansion material 108 (through the cylinder 106, for example). In response to the switch assembly entering the first state, the expansion material 108 may expand, such as due to the transfer of thermal energy through the first thermal energy transference path increasing a temperature of the expansion material 108 (e.g., increasing the temperature of the expansion material 108 to within or above the higher temperature range). The expansion of the expansion material 108 may move the shaft 104 and/or the trigger unit 826 in the second direction 807. During movement of the shaft 104 and/or the trigger unit 826 in the second direction 807 (and/or when the shaft 104 reaches the second position x2 or the third position), the trigger unit 826 may come in contact with the switch 822 and flip the switch 822 to change the state of the switch assembly to the second state (in which thermal energy is transferred from the expansion material 108 to outside the expansion material 108, for example). Alternatively and/or additionally, the trigger unit 826 may come in contact with the switch 822 and flip the switch 822 to change the state of the switch assembly to the second state when the thermal expansion unit 102 reaches the maximum length. For example, a first protruding structure 825 of the trigger unit 826 may come in contact with the switch 822 and flip the switch 822 while the shaft 104 and/or the trigger unit 826 move in the second direction 807 (and/or when the shaft 104 reaches the second position x2).

FIG. 8B illustrates the engine 800 when the switch assembly is in the second state. In some embodiments, when the switch assembly is in the second state, thermal energy is transferred from the expansion material 108 to outside the expansion material 108 (such as to the heat discharge region 810) via the second thermal energy transference path. For example, the second thermal energy transference path may be established through the switch 822 and/or the thermal energy transference unit 836. In an example, the second thermal energy transference path may provide transfer of thermal energy from the expansion material 108, through the thermal energy transference unit 836 in contact with the switch 822, through the switch 822 in contact with a switch component 816, through the switch component 816 in contact with the heat discharge region 810, and/or to the heat discharge region 810 (and/or through the heat discharge region 810 to outside the heat discharge region 810). In response to the switch assembly entering the second state, the expansion material 108 may contract, such as due to the transfer of thermal energy through the second thermal energy transference path decreasing a temperature of the expansion material 108 (e.g., decreasing the temperature of the expansion material 108 to within or below the lower temperature range). The contraction of the expansion material 108 and/or force applied by the force introducing unit 828 (e.g., the compressed spring) may move the shaft 104 and/or the trigger unit 826 in the first direction 805. During movement of the shaft 104 and/or the trigger unit 826 in the first direction 805 (and/or when the shaft 104 reaches the first position x1 or the fourth position), the trigger unit 826 may come in contact with the switch 822 and flip the switch 822 to change the state of the switch assembly to the first state (in which thermal energy is transferred from the heat source 804 to the expansion material 108 via the first thermal energy transference path, for example). Alternatively and/or additionally, the trigger unit 826 may come in contact with the switch 822 and flip the switch 822 to change the state of the switch assembly to the first state when the thermal expansion unit 102 reaches the minimum length and/or the initial length. For example, a second protruding structure 827 of the trigger unit 826 may come in contact with the switch 822 and flip the switch 822 while the shaft 104 and/or the trigger unit 826 move in the first direction 805 (and/or when the shaft 104 reaches the first position x1). Accordingly, the shaft 104 may cycle between the first position x1 and the second position x2 in a reciprocating motion, wherein the output shaft 834 coupled to the shaft 104 may also have the reciprocating motion. For example, the reciprocating motion of the shaft 104 may continue while (e.g., as long as) sufficient temperature difference in the engine 800 is maintained (e.g., sufficient temperature difference between the heat receiving region 812 and the heat discharge region 810).

Figure 8C:
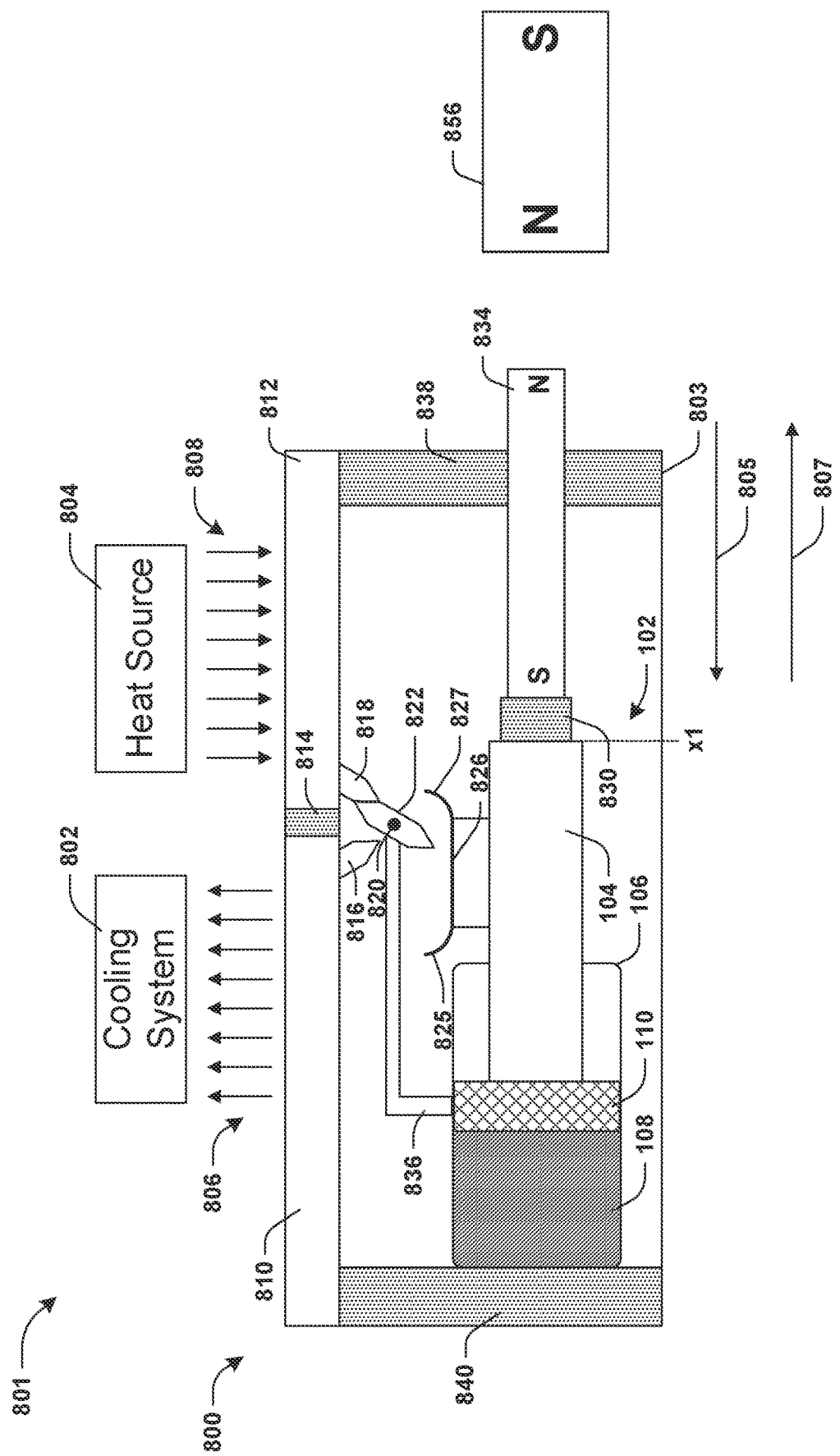
Figure 8D:
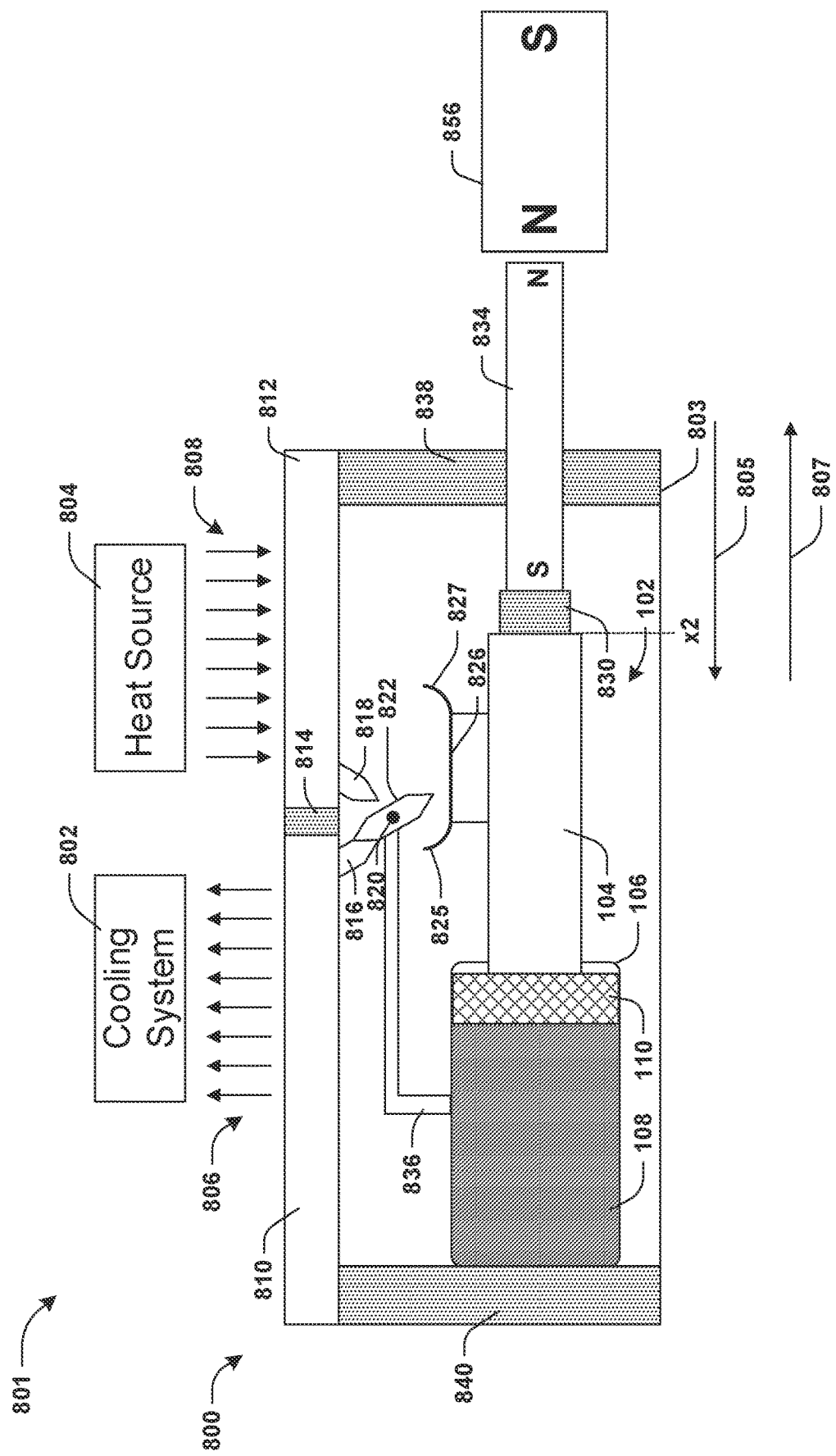

FIGS. 8C-8D illustrate an example of the engine 800 in which the force introducing unit 828 comprises a magnet 856 (instead of a spring, for example). The magnet 856 may be configured to apply a force (e.g., a magnetic force) opposing the shaft 104. As shown in FIGS. 8C-8D, the magnet 856 may be positioned outside the housing structure 803.

Embodiments are contemplated in which the magnet 856 is positioned within the housing structure 803. In the example shown in FIGS. 8C-8D, the output shaft 834 may have a magnetic polarity (e.g., the output shaft 834 may comprise a second magnet). A north pole of the output shaft 834 and a north pole of the magnet 856 may face each other (as shown in FIGS. 8C-8D) or a south pole of the output shaft 834 and a south pole of the magnet 856 may face each other. By having like poles face each other, the magnet 856 may repel the output shaft 834. For example, the magnet 856 may apply a force, to the output shaft 834, in the first direction 805, thereby applying a force to the shaft 104 of the thermal expansion unit 102 in the first direction 805.

FIGS. 8C-8D illustrate an example scenario in which the switch assembly changes from the first state to the second state. In some embodiments, the engine 800 with the magnet 856 may function using one or more of the techniques provided herein with respect to FIGS. 8A-8B. When the switch assembly is in the second state (shown in FIG. 8D), the force applied by the magnet 856 to the shaft 104 (while the expansion material 108 is contracting, for example) may cause the shaft 104 to move from the second position x2 to the first position x1. Accordingly, the shaft 104 may cycle between the first position x1 and the second position x2 in a reciprocating motion, wherein the output shaft 834 coupled to the shaft 104 may also have the reciprocating motion.

Other types of force introducing units (other than the spring and/or the magnet 856, for example) may be used as the force introducing unit 828. In an example, the force introducing unit 828 may comprise one or more engines other than the engine 800 (e.g., one or more engines configured to generate reciprocal motion), such as discussed herein with respect to FIG. 10E.

Figure 9A:
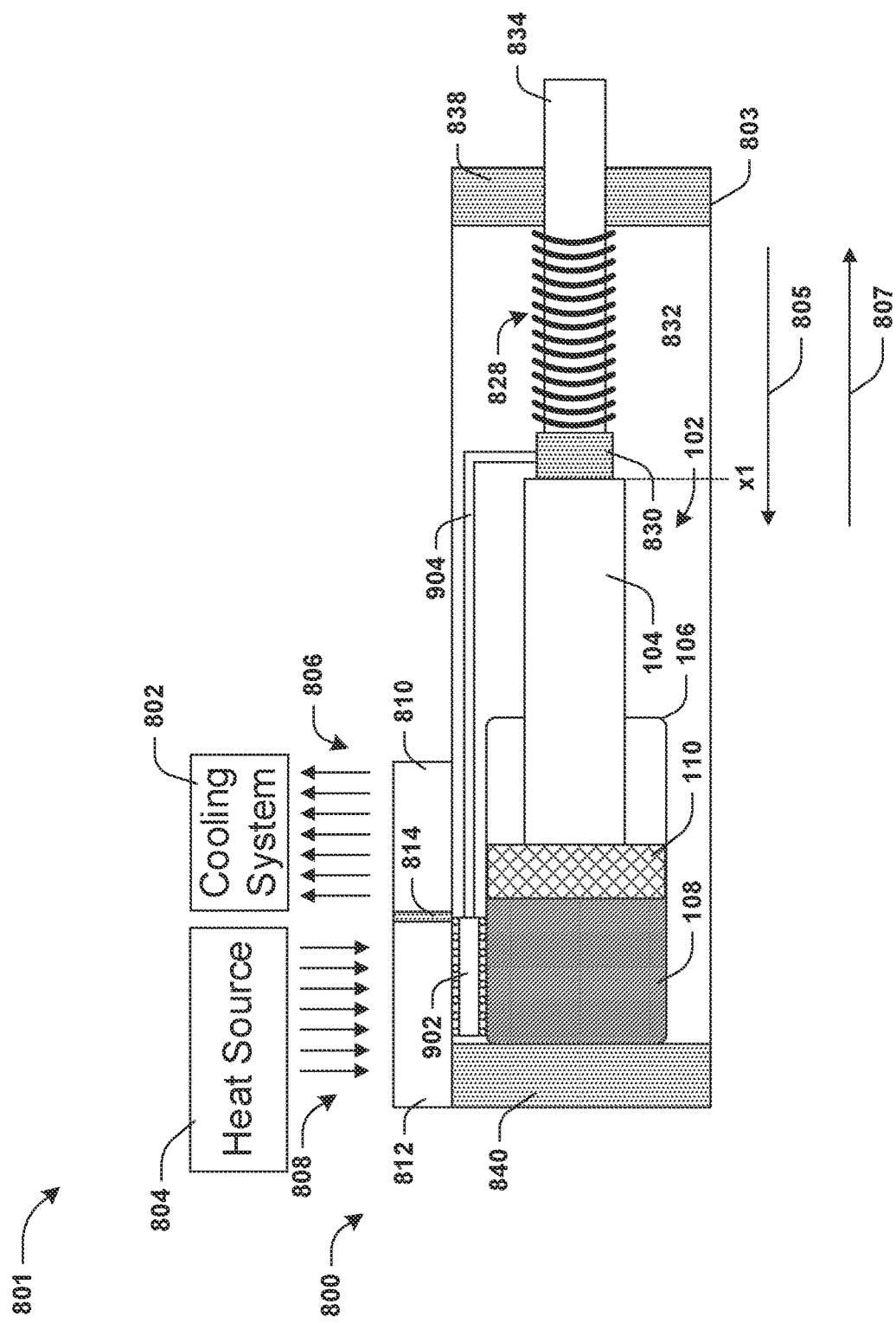
FIGS. 9A-9B are drawings illustrating examples of an engine, according to some embodiments.
Figure 9B:
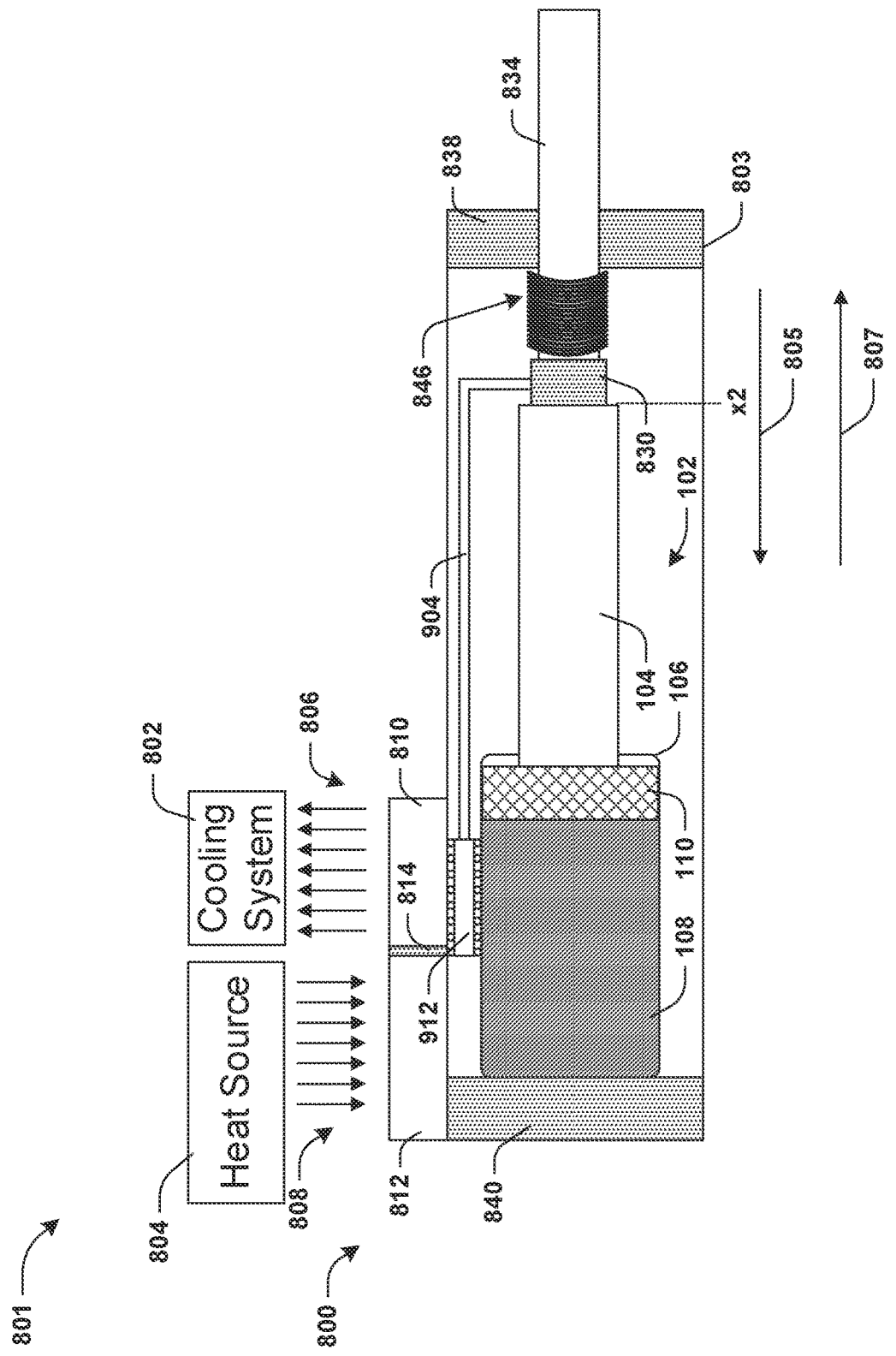

FIGS. 9A-9B illustrate an example of the engine 800, according to some embodiments. Compared to examples of the engine 800 shown in FIGS. 8A-8D, the switch assembly and/or one or more other components may have a different configuration. For example, the switch assembly may comprise a second thermal energy transference unit 902 that is in contact with the thermal expansion unit 102 (e.g., the second thermal energy transference unit 902 may be in contact with the cylinder 106 of the thermal expansion unit 102). In some embodiments, the second thermal energy transference unit 902 may comprise one or more first bearing units on a top side of the second thermal energy transference unit 902 (e.g., the one or more first bearing units may be in contact with the heat receiving region 812 when the switch assembly is in the first state and in contact with the heat discharge region 810 when the switch assembly is in the second state). Alternatively and/or additionally, the second thermal energy transference unit 902 may comprise one or more second bearing units on a bottom side of the second thermal energy transference unit 902 (e.g., the one or more second bearing units may be in contact with the thermal expansion unit 102). A bearing unit of the one or more first bearing units and/or the one or more second bearing units may comprise at least one of a ball bearing, a rolling bearing, a bearing comprising one or more rolling elements (e.g., one or more balls and/or one or more rollers) and/or one or more rings (e.g., one or more races), etc. In some embodiments, the one or more first bearing units and/or the one or more second bearing units may be configured to enable the second thermal energy transference unit 902 to move (e.g., move laterally) with less resistance (e.g., less friction), such that the second thermal energy transference unit 902 can move from being in contact with the heat receiving region 812 to being in contact with the heat discharge region 810 and vice versa. In some embodiments, the second thermal energy transference unit 902 may be coupled to the shaft 104, such as using a coupling component 904 of the switch assembly. For example, the coupling component 904 may be coupled to the second thermal energy transference unit 902 and to the shaft 104 (e.g., the coupling component 904 may be coupled to the insulation structure 830 that is coupled to the shaft 104). Accordingly, movement of the shaft 104 may result in movement of the second thermal energy transference unit 902.

FIGS. 9A-9B illustrate an example scenario in which the switch assembly changes from the first state to the second state, according to some embodiments. FIG. 9A illustrates the engine 800 when the switch assembly is in the first state. In some embodiments, when the switch assembly is in the first state, thermal energy is transferred from the heat source 804 to the expansion material 108 via the first thermal energy transference path. For example, the first thermal energy transference path may be established through the second thermal energy transference unit 902. In an example, the first thermal energy transference path may provide transfer of thermal energy from the heat receiving region 812, through the second thermal energy transference unit 902, to the expansion material 108 (through the cylinder 106, for example). In response to the switch assembly entering the first state, the expansion material 108 may expand, such as due to the transfer of thermal energy through the first thermal energy transference path increasing a temperature of the expansion material 108 (e.g., increasing the temperature of the expansion material 108 to within or above the higher temperature range). The expansion of the expansion material 108 may move the shaft 104 and/or the second thermal energy transference unit 902 in the second direction 807 (e.g., the movement of the shaft 104 in the second direction 807 moves the second thermal energy transference unit 902 in the second direction 807). The switching assembly may enter the second state during movement of the shaft 104 and/or the second thermal energy transference unit 902 in the second direction 807 and/or when the shaft 104 reaches the second position x2. For example, in the second state, the second thermal energy transference unit 902 may be in contact with the heat discharge region 810 and the thermal expansion unit 102 (e.g., the second thermal energy transference unit 902 may be between the heat discharge region 810 and the thermal expansion unit 102) and/or the second thermal energy transference unit 902 may be laterally offset from the heat receiving region 812 such that it is not in contact with the heat receiving region 812.

FIG. 9B illustrates the engine 800 when the switch assembly is in the second state. In some embodiments, when the switch assembly is in the second state, thermal energy is transferred from the expansion material 108 to outside the expansion material 108 (such as to the heat discharge region 810) via the second thermal energy transference path. For example, the second thermal energy transference path may be established through the second thermal energy transference unit 902. In an example, the second thermal energy transference path may provide transfer of thermal energy from the expansion material 108, through the second thermal energy transference unit 902 in contact with the heat discharge region 810, to the heat discharge region 810 (and/or through the heat discharge region 810 to outside the heat discharge region 810). In response to the switch assembly entering the second state, the expansion material 108 may contract, such as due to the transfer of thermal energy through the second thermal energy transference path decreasing a temperature of the expansion material 108 (e.g., decreasing the temperature of the expansion material 108 to within or below the lower temperature range). The contraction of the expansion material 108 and/or force applied by the force introducing unit 828 (e.g., the compressed spring) may move the shaft 104 and/or the second thermal energy transference unit 902 in the first direction 805 (e.g., the movement of the shaft 104 in the first direction 805 moves the second thermal energy transference unit 902 in the first direction 805). The switching assembly may enter the first state during movement of the shaft 104 and/or the second thermal energy transference unit 902 in the first direction 805 and/or when the shaft 104 reaches the first position x1. Accordingly, the shaft 104 may cycle (e.g., continuously cycle) between the first position x1 and the second position x2 in a reciprocating motion, wherein the output shaft 834 coupled to the shaft 104 may also have the reciprocating motion. For example, the expansion material 108 of the thermal expansion unit 102 cycles (e.g., continuously cycles) between expanding and contracting in which the thermal expansion unit 102 continuously increases and decreases in length to generate the reciprocating motion (e.g., the thermal expansion unit 102 may increase in length until reaching the maximum length, followed by decreasing in length until reaching the minimum length or the initial length, followed by increasing in length until reaching the maximum length, etc.).

Figure 10A:
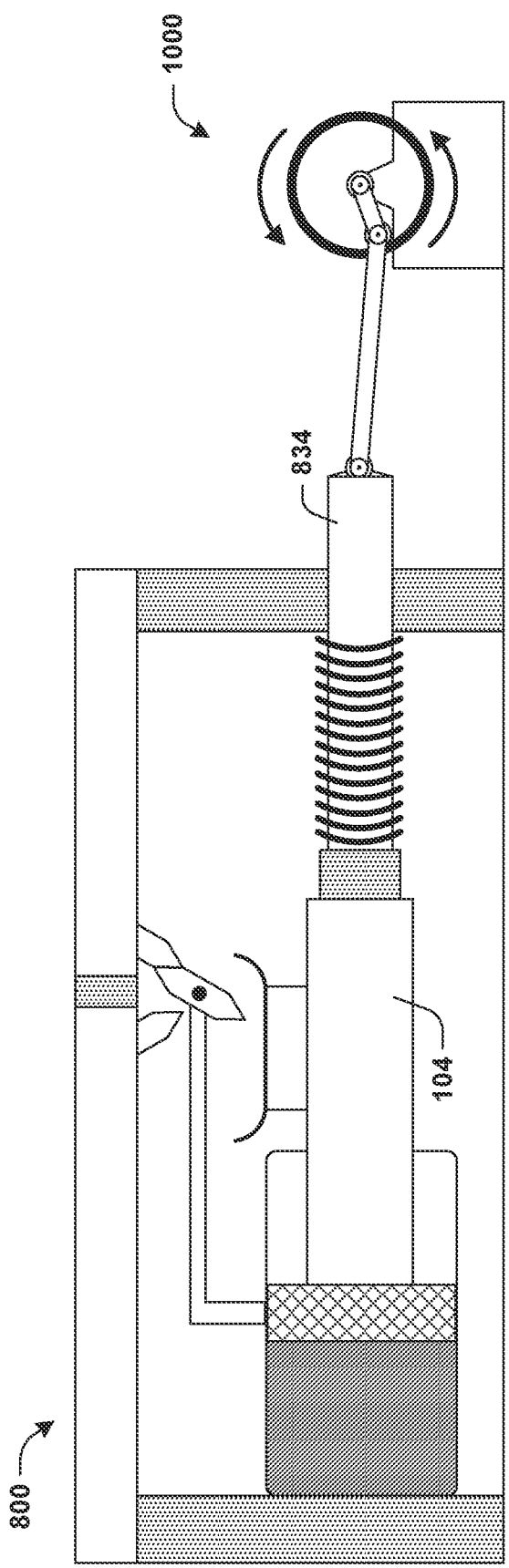
Figure 10C:
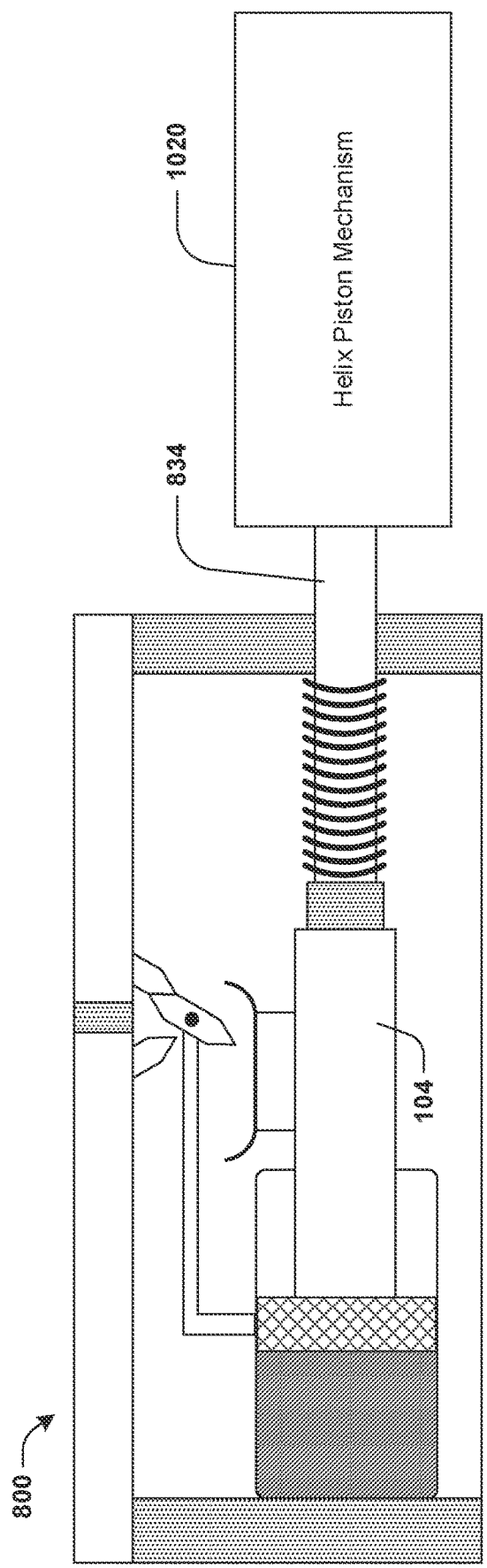
Figure 10E:
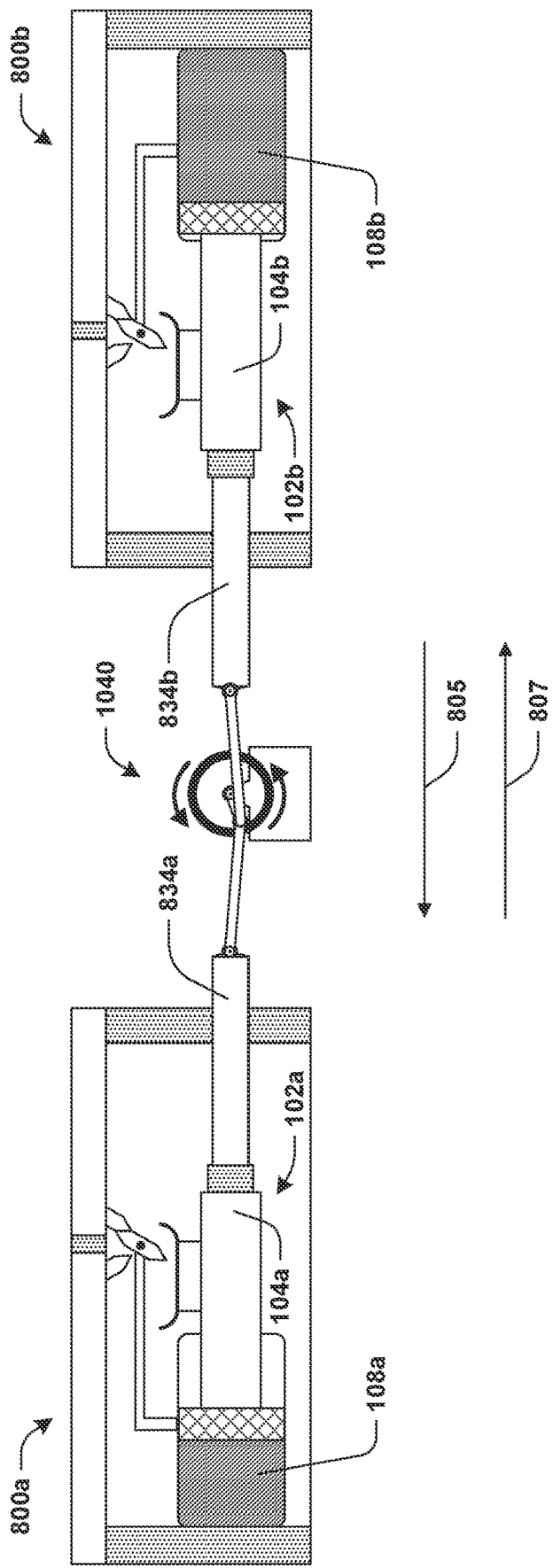

Although FIGS. 9A-9B illustrate the force introducing unit 828 comprising the spring, it may be appreciated that other types force introducing units may be used in place of and/or in addition to the spring, such as at least one of a mechanical energy storing unit other than a spring, the magnet 856 (e.g., discussed with respect to FIGS. 8C-8D), one or more engines other than the engine 800 (e.g., one or more engines configured to generate reciprocal motion) such as discussed herein with respect to FIG. 10E, etc.

In some embodiments, the reciprocal motion (e.g., linear motion) of the shaft 104 (and/or the reciprocal motion of the output shaft 834) generated by the engine 800 (in accordance with one or more of the techniques provided herein, such as provided with respect to FIGS. 8A-8D and/or 9A-9B) may be used to at least one of perform mechanical work and/or one or more mechanical tasks (e.g., the reciprocal motion of the shaft 104 may be used directly or indirectly to perform the mechanical work and/or the one or more mechanical tasks), convert the mechanical energy of the reciprocal motion to another type of energy such as electrical power, etc.

Alternatively and/or additionally, the reciprocal motion of the shaft 104 (and/or the reciprocal motion of the output shaft 834) generated by the engine 800 may be converted to rotary motion (e.g., at least one of rotational motion, orbital motion, circular motion, etc.), wherein the rotary motion may be used to at least one of perform mechanical work and/or one or more mechanical tasks (e.g., the rotary motion may be used directly or indirectly to perform the mechanical work and/or the one or more mechanical tasks), convert the mechanical energy of the rotary motion to another type of energy such as electrical power, etc.

In an example, a reciprocal to rotary conversion apparatus may be used to convert the reciprocal motion generated by the engine 800 to rotary motion. FIGS. 10A-10E illustrate examples of converting the reciprocal motion of the shaft 104 to rotary motion, according to some embodiments. FIG. 10A illustrates an example in which a crank shaft apparatus 1000 is used to convert the reciprocal motion of the shaft 104 to rotary motion, wherein the crank shaft apparatus 1000 may be coupled to the shaft 104 (e.g., the crank shaft apparatus 1000 may be coupled to the shaft 104 via being coupled to the output shaft 834) such that the reciprocal motion of the shaft 104 and/or the output shaft 834 is converted to rotational motion by the crank shaft apparatus 1000. FIG. 10B illustrates an example in which a rack and pinion apparatus 1010 is used to convert the reciprocal motion of the shaft 104 to rotary motion, wherein the rack and pinion apparatus 1010 may be coupled to the shaft 104 (e.g., the rack and pinion apparatus 1010 may be coupled to the shaft 104 via being coupled to the output shaft 834) such that the reciprocal motion of the shaft 104 and/or the output shaft 834 is converted to rotational motion by the rack and pinion apparatus 1010. FIG. 10C illustrates an example in which a helix piston mechanism 1020 is used to convert the reciprocal motion of the shaft 104 to rotary motion, wherein the helix piston mechanism 1020 may be coupled to the shaft 104 (e.g., the helix piston mechanism 1020 may be coupled to the shaft 104 via being coupled to the output shaft 834) such that the reciprocal motion of the shaft 104 and/or the output shaft 834 is converted to rotational motion by the helix piston mechanism 1020. FIG. 10D illustrates an example in which a magnetic apparatus 1030 is used to convert the reciprocal motion of the shaft 104 to rotary motion, wherein the magnetic apparatus 1030 may be coupled to the shaft 104 (e.g., the magnetic apparatus 1030 may be coupled to the shaft 104 via being coupled to the output shaft 834) such that the reciprocal motion of the shaft 104 and/or the output shaft 834 is converted to rotational motion by the magnetic apparatus 1030. In some embodiments, reciprocal motion of a magnet 1032 coupled to the shaft 104 (e.g., the magnet 1032 may be coupled to the shaft 104 via being coupled to the output shaft 834) may cause a magnetic rotor 1034 to rotate. In some embodiments, the engine 800 with the magnetic apparatus 1030 may implement a magnetic heat transfer engine and/or a magnetic heat transfer motor.

It may be appreciated that, in some embodiments, other types of reciprocal to rotary conversion apparatuses other than those shown and/or described herein may be used to convert reciprocal motion of the shaft 104 to rotary motion.

In some embodiments, opposing engines may be used as force introducing units for each other (such as in place of or in addition to at least one of a magnet, a mechanical energy storing device such as a spring, etc.). In some embodiments, a reciprocal to rotary conversion apparatus may be used to convert reciprocal motion generated by the opposing engines to rotary motion. The reciprocal to rotary conversion apparatus may comprise at least one of a crank shaft apparatus, a rack and pinion apparatus, a helix piston mechanism, a magnetic apparatus and/or other type of reciprocal to rotary conversion apparatus. FIG. 10E illustrates an example in which a crank shaft apparatus 1040 is used to convert reciprocal motion of shafts 104 of opposing engines 800a and 800b. In some embodiments, the first engine 800a may act as a force introducing unit for the second engine 800b and/or the second engine 800b may act as a force introducing unit for the first engine 800a. Although FIG. 10E shows a single engine acting as a force introducing unit for another single engine, embodiments are contemplated in which: (i) a single engine acts as a force introducing unit for multiple engines (such as where an output shaft of the single engine applies force, to one or more output shafts of the multiple engines, that causes thermal expansion units of the multiple engines to decrease in length when expansion material within the thermal expansion units are contracting); (ii) multiple engines act as a force introducing unit for a single engine (such as where one or more output shafts of the multiple engines apply force, to an output shaft of the single engine, that causes a thermal expansion unit of the single engine to decrease in length when expansion material within the thermal expansion unit is contracting); and/or (iii) a first set of multiple engines act as a force introducing unit for a second set of multiple engines (such as where one or more output shafts of the first set of multiple engines apply force, to one or more output shafts of the second set of multiple engines, that causes thermal expansion units of the second set of multiple engines to decrease in length when expansion material within the thermal expansion units are contracting). In some examples, when first expansion material 108a in the first engine 800a is expanding and/or a first shaft 104a of a first thermal expansion unit 102a of the first engine 800a is moving in the second direction 807, the first engine 800a (e.g., the movement of the first shaft 104a in the second direction 807) may apply a force to a second shaft 104b of a second thermal expansion unit 102b of the second engine 800b while second expansion material 108b within the second thermal expansion unit 102b contracts, thereby forcing the second shaft 104b to move in the second direction 807. Alternatively and/or additionally, when the second expansion material 108b within the second thermal expansion unit 102b is expanding and/or the second shaft 104b of the second thermal expansion unit 102b of the second engine 800b is moving in the first direction 805, the second engine 800b (e.g., the movement of the second shaft 104b in the first direction 805) may apply a force to the first shaft 104a of the first thermal expansion unit 102a of the first engine 800a while the first expansion material 108a in the first engine 800a contracts, thereby forcing the first shaft 104a to move in the first direction 805. The crank shaft apparatus 1040 may be coupled to shafts 104a and/or 104b of the engines 800a and/or 800b (e.g., the crank shaft apparatus 1040 may be coupled to the first shaft 104a via a first output shaft 834a of the first engine 800a and/or may be coupled to the second shaft 104b via a second output shaft 834b of the second engine 800b), wherein the crank shaft apparatus 1040 may convert reciprocal motion of the shafts 104a and/or 104b to rotary motion.

In some embodiments, a power system comprising one or more engines 800 is provided. In some embodiments, the power system may comprise a power unit. In some embodiments, the power unit may be configured to convert mechanical energy and/or torque applied by one or more engines 800 into electrical power (e.g., electrical energy and/or a different type of power). For example, the power unit may comprise a generator coupled to one or more shafts 104 of the one or more engines 800 (e.g., the generator may be coupled to a shaft of the one or more shafts 104 via an output shaft 834). Reciprocal motion of the one or more shafts 104 causes the generator to produce electrical power. In an example, the generator may convert (e.g., directly convert) reciprocal motion generated by the one or more engines 800 to electrical power. Alternatively and/or additionally, the generator may comprise a reciprocal to rotary conversion apparatus to convert the reciprocal motion to rotary motion, wherein the generator may convert (e.g., directly convert) the rotary motion output by the reciprocal to rotary conversion apparatus to electrical power. In some embodiments, electrical power that is produced may be stored within an electricity storage device (e.g., a battery, for example) comprised within the power system. Alternatively and/or additionally, the generator and/or the power system may be connected to a power network such that electrical power that is produced may be transferred to the power network.

In accordance with some embodiments, an engine (e.g., an engine 200 discussed with respect to FIGS. 2A-2B, 3A-3L, and 4-7 and/or an engine 800 discussed with respect to FIGS. 8A-8D and 9A-9B) is provided. The engine comprises a thermal expansion unit (e.g., thermal expansion unit 102) comprising expansion material (e.g., expansion material 108) having a thermal expansion property in which the expansion material expands in response to a temperature increase of the expansion material and contracts in response to a temperature decrease of the expansion material. The engine comprises a structure (e.g., the rotational structure 202 and/or the housing structure 803) comprising a heat receiving region (e.g., the heat receiving region 204 and/or the heat receiving region 212), wherein at least a portion of the thermal expansion unit is disposed within the structure. The heat receiving region is configured to transfer thermal energy from a source of thermal energy (e.g., the heat source 236 and/or the heat source 804) to the expansion material through a first thermal energy transference path.

In an example in which the engine is engine 200, the first thermal energy transference path may correspond to a path through which thermal energy is transferred from the heat receiving region 204 to the expansion material when the thermal expansion unit is in contact with the inner surface 215b of the heat receiving region 204 (e.g., the thermal energy may be transferred from the heat receiving region 204 to the expansion material via the bearing unit 120 that is in contact with the inner surface 215b of the heat receiving region 204).

In an example in which the engine is engine 800, the first thermal energy transference path may correspond to a path through which thermal energy is transferred from the heat receiving region 812 to the expansion material via the thermal energy transference unit 836 and/or the second thermal energy transference unit 902. The transfer of thermal energy to the thermal expansion unit causes expansion of the expansion material within the thermal expansion unit. The expansion of the expansion material causes an increase in length of the thermal expansion unit.

The increase in length of the thermal expansion unit causes establishment of a second thermal energy transference path through which thermal energy is transferred from the expansion material to outside the thermal expansion unit.

In an example in which the engine is engine 200, the second thermal energy transference path may correspond to a path through which thermal energy is transferred from the expansion material to outside the thermal expansion unit when the thermal expansion unit is within the second region 223, such as when the thermal expansion unit is in contact with the inner surface 215a of the heat discharge region 212 (e.g., the thermal energy may be transferred from the expansion material to outside the thermal expansion unit via cooling fluid within the second region 223 and/or may be transferred from the expansion material to the heat discharge region 212 via the bearing unit 120 that is in contact with the inner surface 215a of the heat discharge region 212).

In an example in which the engine is engine 800, the second thermal energy transference path may correspond to a path through which thermal energy is transferred from the expansion material to outside the thermal expansion unit, such as to the heat discharge region 810 via the thermal energy transference unit 836 and/or the second thermal energy transference unit 902.

In an example in which the engine is engine 200, the increase in length of the thermal expansion unit may cause establishment of the second thermal energy transference path by way of applying a force to a part of the first inner surface section 252 that the thermal expansion unit is in contact with, which pushes the thermal expansion unit and the rotor 214 in the direction of rotation 220 towards the second region 223.

In an example in which the engine is engine 800, the increase in length of the thermal expansion unit may cause establishment of the second thermal energy transference path by way of the increase in length causing the switch assembly to switch from the first state to the second state (such as where the trigger unit 826 actuates the switch 822 due to the increase in length and/or where the second thermal energy transference unit 902 moves from being in contact with the heat receiving region 812 to being in contact with the heat discharge region 810).

In some embodiments, the thermal expansion unit comprises a cylinder (e.g., cylinder 106) in which the expansion material is disposed, a piston (e.g., piston 110) within the cylinder, and/or a shaft (e.g., shaft 104) coupled to the piston, wherein the increase in length of the thermal expansion unit corresponds to movement of the shaft in a direction away from the cylinder.

In some embodiments, the transfer of thermal energy from the thermal expansion unit to outside the thermal expansion unit causes contraction of the expansion material. The contraction of the expansion material allows establishment of a third thermal energy transference path through which thermal energy is transferred from the heat receiving region to the expansion material. The third thermal energy transference path may be the same as (or different than) the first thermal energy transference path. The transfer of thermal energy from the heat receiving region to the expansion material causes expansion of the expansion material within the thermal expansion unit, wherein the expansion of the expansion material causes an increase in length of the thermal expansion unit. Accordingly, the expansion material of the thermal expansion unit cycles (e.g., continuously cycles) between expanding and contracting in which the thermal expansion unit increases and decreases in length. The thermal expansion unit cycling (e.g., continuously cycling) between increasing and decreasing in length may generate rotary motion (e.g., engine 200) and/or reciprocal motion (e.g., engine 800).

In an example in which the engine is engine 200, the contraction of the expansion material may allow establishment of the third thermal energy transference path (e.g., a path through which thermal energy is transferred from the heat receiving region 204 to the expansion material when the thermal expansion unit is in contact with the inner surface 215b of the heat receiving region 204) by way of the thermal expansion unit decreasing in length while moving along the second inner surface section such that the thermal expansion unit can travel without becoming stuck and/or such that rotational force applied by other thermal expansion units (e.g., one or more thermal expansion units within the first region 221) to the rotor 214 cause the rotor 214 to rotate in the direction of rotation 220.

In an example in which the engine is engine 800, the contraction of the expansion material may allow establishment of the third thermal energy transference path by way of allowing the force introducing component 838 to move the shaft 104 in the first direction 805 causing the switch assembly to switch from the second state to the first state (such as where the trigger unit 826 actuates the switch 822 due to the decrease in length and/or where the second thermal energy transference unit 902 moves from being in contact with the heat discharge region 810 to being in contact with the heat receiving region 812).

In some embodiments, an engine provided herein (e.g., the engine 200 and/or the engine 800) may be manufactured in various sizes and/or dimensions, wherein a size and/or one or more dimensions of the engine may be selected based upon a location in which the engine is intended to be used. For example, smaller engines may be manufactured for home and/or personal use, whereas larger engines may be manufactured for manufacturing facilities, power plants (e.g., nuclear power plants), etc. In some embodiments, the engine may be located on a roof of a home where solar thermal energy may be used to generate mechanical energy and/or electrical power. Alternatively and/or additionally, the engine may be located proximal a heat transfer interface in a car and/or home that may use heat from the heat transfer interface to generate mechanical energy and/or electrical power.

In some embodiments, a temperature difference of an engine provided herein (e.g., the engine 200 and/or the engine 800) may be between about 50 degrees and about 80 degrees, such as between about 60 degrees and 70 degrees. The temperature difference may correspond to: (i) a temperature difference between the heat receiving region 204 and the heat discharge region 212; (ii) a temperature difference between the first region 221 and the second region 223; (iii) and/or a temperature difference between the heat receiving region 812 and the heat discharge region 810. In some embodiments, a minimum temperature difference required for implementation (e.g., outputting mechanical energy such as rotary motion and/or reciprocal motion) is lower than other heat engines, and thus may be used in more situations and may have more uses due to the lower minimum temperature difference (e.g., there may be more opportunities to benefit from an engine provided herein since the minimum temperature difference required for implementation is comparatively low). In an example, the present technology may make use of waste heat provided by a home or power plant to generate mechanical energy and/or electrical power, whereas other heat engines may not be able to operate with the waste heat due to the other heat engines having higher temperature difference requirements for operation.

In some embodiments, an engine provided herein (e.g., the engine 200 and/or the engine 800) may output mechanical energy (e.g., rotary motion and/or reciprocal motion) having a high level of torque compared to other heat engines.

It may be appreciated that an engine provided herein (e.g., the engine 200 and/or the engine 800) may be less costly to implement and/or use than other systems that attempt to implement a system for producing mechanical energy and/or electrical power using heat, such as as a result of the engine having fewer components and/or smaller components than the other systems.

Although some embodiments of the present disclosure are described with respect to an implementation in which expansion material is used that expands with an increase in temperature, it may be appreciated that, in accordance with some embodiments, an expansion material that expands in response to a decrease in temperature may be used in thermal expansion units. In such embodiments, a thermal expansion unit 102 comprising the expansion material may increase in length when a temperature of the thermal expansion unit 102 decreases and/or the thermal expansion unit 102 may decrease in length when a temperature of the thermal expansion unit increases. In an example, the expansion material may comprise at least one of water (and/or ice), silver, cast iron, bismuth, etc.

In some embodiments, the views shown in FIGS. 1A-10E comprise show various internal and/or external features and/or characteristics.

In some embodiments, one, some and/or all instances of "heat" throughout the present disclosure may correspond to and/or may be interchanged with "thermal energy".

In some embodiments, one, some and/or all instances of "thermal energy" throughout the present disclosure may correspond to and/or may be interchanged with "heat".

Implementation of at least some of the disclosed subject matter may lead to benefits including, but not limited to, lower temperature difference required for implementation of an engine (e.g., the engine 200 and/or the engine 800) that generates mechanical energy and/or electrical power, providing for a wider variety of heat sources that can be used to implement the engine (e.g., the engine may use any heat source even with low temperature differentials), a high level of torque of mechanical energy output using the engine, etc.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An engine, comprising:
   a rotor;
   a plurality of thermal expansion units coupled to the rotor, wherein each thermal expansion unit of the plurality of thermal expansion units comprises expansion material having a thermal expansion property in which the expansion material:
      expands in response to a temperature increase of the expansion material; and
      contracts in response to a temperature decrease of the expansion material; and
   a rotational structure configured to facilitate rotation of the rotor around a first axis of rotation, wherein:
      an inner surface of the rotational structure defines a space in which the rotor and the plurality of thermal expansion units are disposed;
      the inner surface defines at least one of:
         part but not all of a circle; or
         part but not all of an ellipse;
      thermal energy is transferred from a source of thermal energy to one or more first thermal expansion units, of the plurality of thermal expansion units, that are within a first region of the space;
      transfer of thermal energy to the one or more first thermal expansion units causes expansion of expansion material within the one or more first thermal expansion units; and
      the expansion of the expansion material within the one or more first thermal expansion units causes rotation of the rotor around the first axis of rotation.

2. A power system configured to produce electrical power, the power system comprising:
   the engine of claim 1, comprising an output shaft coupled to the rotor, wherein the rotation of the rotor around the first axis of rotation causes rotary motion of the output shaft; and
   a power unit, comprising a generator, coupled to the output shaft, wherein rotary motion of the output shaft causes the generator to produce the electrical power.

3. The engine of claim 1, wherein:
   the rotational structure comprises a heat receiving region through which thermal energy is transferred from the source of thermal energy to the one or more first thermal expansion units;
   a first thermal expansion unit of the one or more first thermal expansion units comprises a bearing unit in contact with the inner surface of the rotational structure;
   the bearing unit travels along the inner surface during rotation of the rotor around the first axis of rotation;
   the inner surface of the rotational structure comprises an inner surface of the heat receiving region; and
   when the first thermal expansion unit is in contact with the inner surface of the heat receiving region, thermal energy is transferred from the heat receiving region, to expansion material within the first thermal expansion unit, via the bearing unit.

4. The engine of claim 3, wherein:
   the rotational structure comprises insulation regions configured to provide insulation between (i) the heat receiving region through which thermal energy is transferred to induce rotation of the rotor and (ii) a heat discharge region, of the rotational structure, through which thermal energy is transferred to allow rotation of the rotor, wherein the insulation regions comprise:
      a first insulation region separating a first portion of the heat receiving region from a first portion of the heat discharge region; and
      a second insulation region separating a second portion of the heat receiving region from a second portion of the heat discharge region; and
   during rotation of the rotor in a rotational direction, the first thermal expansion unit travels, in the rotational direction, along:
      the inner surface of the heat receiving region;
      an inner surface of the first insulation region;
      an inner surface of the heat discharge region; and
      an inner surface of the second insulation region.

5. The engine of claim 1, wherein:
   during rotation of the rotor, a first thermal expansion unit, of the one or more first thermal expansion units, leaves the first region of the space and enters a second region of the space;
   a first temperature of the first region of the space is higher than a second temperature of the second region of the space; and
   expansion material within the first thermal expansion unit contracts when the first thermal expansion unit is in the second region of the space.

6. The engine of claim 5, wherein:
   the contraction of the expansion material within the first thermal expansion unit allows rotation of the rotor around the first axis of rotation.

7. The engine of claim 1, wherein:
the first axis of rotation is offset from at least one of a centroid of the circle or a centroid of the ellipse.

8. The engine of claim 7, wherein:
a maximum distance between the first axis of rotation and the inner surface is between a first point of the inner surface and the first axis of rotation;
a minimum distance between the first axis of rotation and the inner surface is between a second point of the inner surface and the first axis of rotation;
the inner surface comprises a first inner surface section between the first point and the second point and a second inner surface section between the first point and the second point, wherein the first inner surface section is opposite the second inner surface section;
along a rotational direction in which the rotor rotates, distances between the first inner surface section and the first axis of rotation increase;
the expansion of the expansion material within the one or more first thermal expansion units occurs when the one or more first thermal expansion units are in contact with the first inner surface section;
distances between the second inner surface section and the first axis of rotation decrease along the rotational direction in which the rotor rotates; and
contraction of the expansion material within the one or more first thermal expansion units occurs when the one or more first thermal expansion units are in contact with the second inner surface section.

9. The engine of claim 8, wherein:
the rotational structure comprises a heat receiving region through which thermal energy is transferred from the source of thermal energy to the one or more first thermal expansion units;
the first inner surface section of the inner surface of the rotational structure comprises at least a portion of an inner surface of the heat receiving region of the rotational structure; and
the second inner surface section of the inner surface of the rotational structure comprises at least a portion of an inner surface of a heat discharge region of the rotational structure, wherein the contraction of the expansion material within the one or more first thermal expansion units is caused by transfer of thermal energy from the one or more first thermal expansion units to outside the one or more first thermal expansion units when the one or more first thermal expansion units are in contact with the heat discharge region.

10. The engine of claim 1, wherein:
a first thermal expansion unit of the plurality of thermal expansion units comprises:
 a first cylinder;
 a first piston within the first cylinder;
 a first shaft coupled to the first piston; and
 expansion material within the first cylinder; and
expansion of the expansion material within the first cylinder increases a length of the first thermal expansion unit.

11. The engine of claim 1, wherein at least one of:
the rotor has a non-circular shape; or
the rotor is rectangle-shaped, star-shaped or triangle-shaped.

12. The engine of claim 1, wherein:
the rotational structure comprises:
 a plurality of heat receiving regions; and
 a plurality of heat discharge regions; and
along the inner surface of the rotational structure, regions alternate between a heat receiving region of the plurality of heat receiving regions and a heat discharge region of the plurality of heat discharge regions.

13. The engine of claim 1, wherein:
the inner surface of the rotational structure comprises at least one of:
 a first portion defining part, but not all, of a first circle or a first ellipse; or
 a second portion defining part, but not all, of a second circle or a second ellipse.

14. The engine of claim 1, wherein:
a first thermal expansion unit of the one or more first thermal expansion units is coupled to a first surface of the rotor; and
an angle of orientation of the first thermal expansion unit relative to the first surface is less than 90 degrees.

15. The engine of claim 1, wherein:
a first thermal expansion unit of the one or more first thermal expansion units is angled in a direction opposite to a rotational direction of the rotor.

16. An engine, comprising:
a rotor;
a plurality of thermal expansion units coupled to the rotor, wherein each thermal expansion unit of the plurality of thermal expansion units comprises expansion material having a thermal expansion property in which the expansion material:
 expands in response to a temperature increase of the expansion material; and
 contracts in response to a temperature decrease of the expansion material; and
a rotational structure configured to facilitate rotation of the rotor around a first axis of rotation, wherein:
 an inner surface of the rotational structure defines a space in which the rotor and the plurality of thermal expansion units are disposed;
 the rotational structure comprises:
  a heat receiving region;
  a heat discharge region; and
  a set of insulation regions configured to provide thermal insulation between the heat receiving region and the heat discharge region, the set of insulation regions comprising:
   a first insulation region separating a first portion of the heat receiving region from a first portion of the heat discharge region; and
   a second insulation region separating a second portion of the heat receiving region from a second portion of the heat discharge region;
 the inner surface of the rotational structure comprises:
  an inner surface of the heat receiving region;
  an inner surface of the heat discharge region;
  an inner surface of the first insulation region; and
  an inner surface of the second insulation region;
 when a first thermal expansion unit of the plurality of thermal expansion units is in contact with the inner surface of the heat receiving region, a first thermal energy is transferred from the heat receiving region to expansion material within the first thermal expansion unit;
 transfer of the first thermal energy to the first thermal expansion unit causes expansion of the expansion material within the first thermal expansion unit;
 the expansion of the expansion material within the first thermal expansion unit causes rotation of the rotor around the first axis of rotation;

when the first thermal expansion unit is in contact with the inner surface of the heat discharge region, a second thermal energy is transferred from the first thermal expansion unit to outside the first thermal expansion unit;

transfer of the second thermal energy from the first thermal expansion unit causes contraction of the expansion material within the first thermal expansion unit to allow rotation of the rotor around the first axis of rotation;

the inner surface of the rotational structure defines a circle or an ellipse;

the inner surface of the heat receiving region defines a first part of the circle or a first part of the ellipse;

the inner surface of the heat discharge region defines a second part of the circle or a second part of the ellipse;

the inner surface of the first insulation region defines a third part of the circle or a third part of the ellipse; and the inner surface of the second insulation region defines a fourth part of the circle or a fourth part of the ellipse.

17. The engine of claim 16, wherein:

during rotation of the rotor in a rotational direction around the first axis of rotation, the first thermal expansion unit travels, in the rotational direction, along:
- the inner surface of the heat receiving region;
- the inner surface of the first insulation region;
- the inner surface of the heat discharge region; and
- the inner surface of the second insulation region.

18. The engine of claim 16, wherein:

the first thermal expansion unit comprises:
- a first cylinder;
- a first piston within the first cylinder;
- a first shaft coupled to the first piston; and
- expansion material within the first cylinder; and expansion of the expansion material within the first cylinder increases a length of the first thermal expansion unit.

19. The engine of claim 16, wherein:

the expansion of the expansion material within the first thermal expansion unit increases a length of the first thermal expansion unit;

the first thermal expansion unit is coupled to a first surface of the rotor;

an angle of orientation of the first thermal expansion unit relative to the first surface is less than 90 degrees; and the first thermal expansion unit is angled in a direction opposite to a rotational direction of the rotor.

20. The engine of claim 16, wherein:

each thermal expansion unit of the plurality of thermal expansion units is coupled to the rotor via a hinge.

* * * * *